March 4, 1930.  L. A. OSGOOD ET AL  1,749,192
AUTOMATIC RECORDING SCALE
Filed Dec. 8, 1920  15 Sheets-Sheet 1
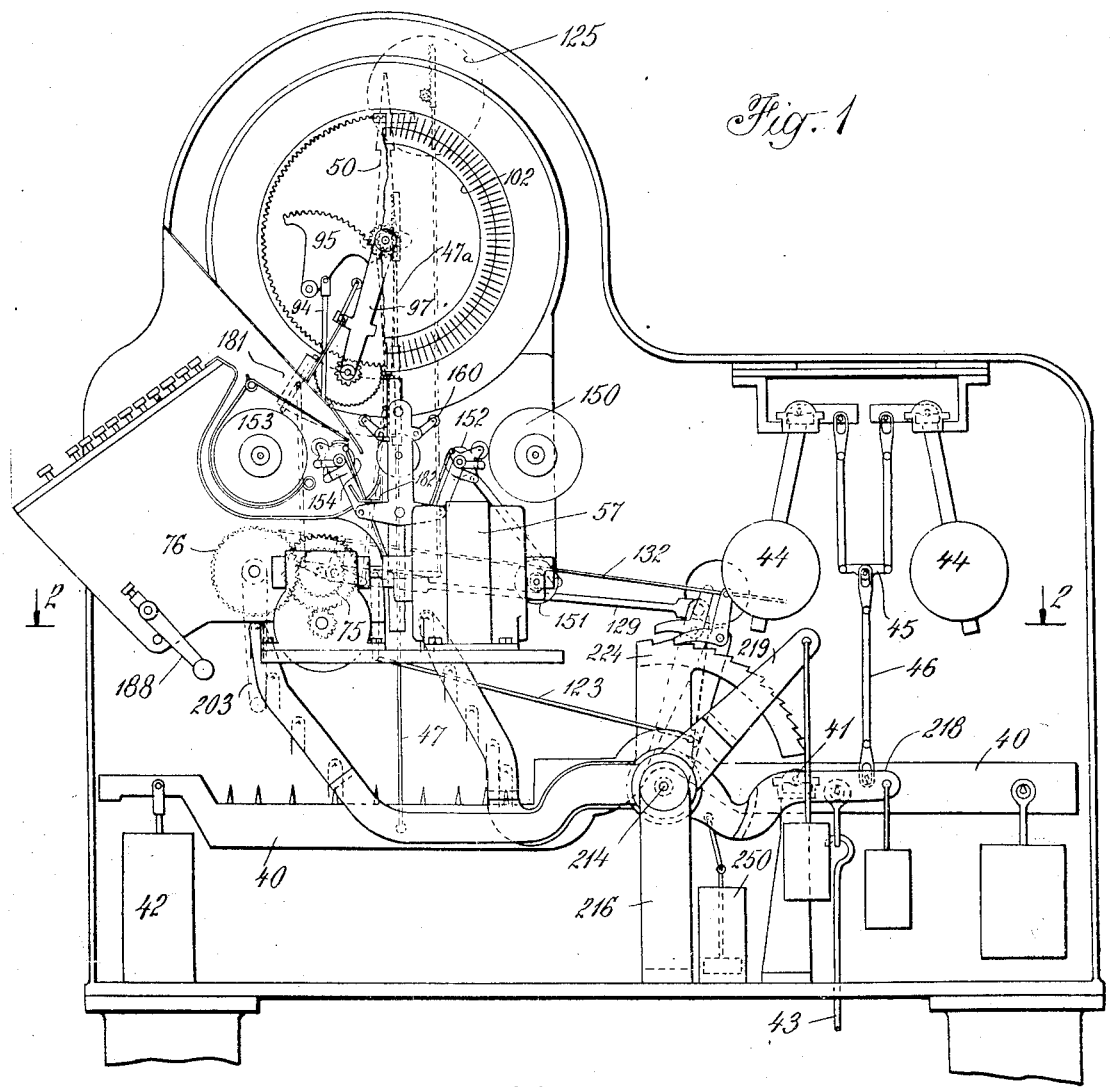
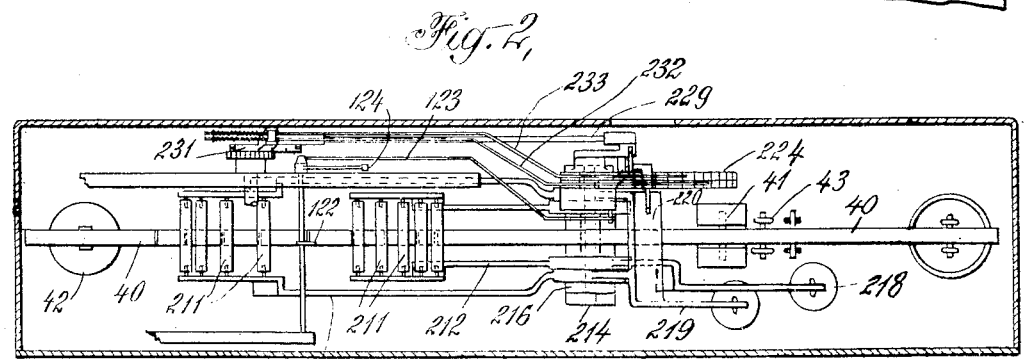

March 4, 1930. L. A. OSGOOD ET AL 1,749,192
AUTOMATIC RECORDING SCALE
Filed Dec. 8, 1920 15 Sheets-Sheet 2
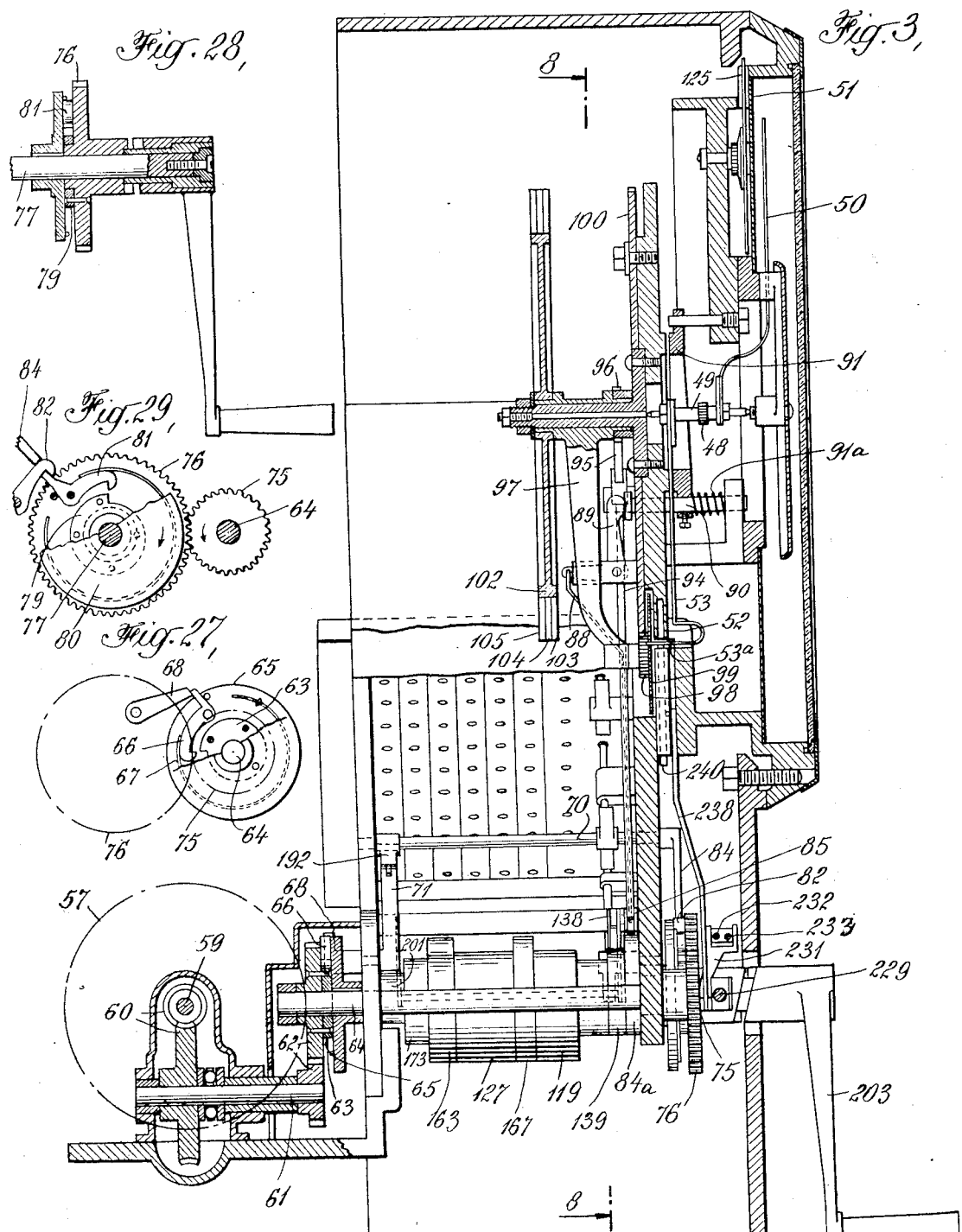
Inventors
L. A. Osgood
Elmer E. Wolf
By their Attorneys
Kerr Page Cooper & Hayward

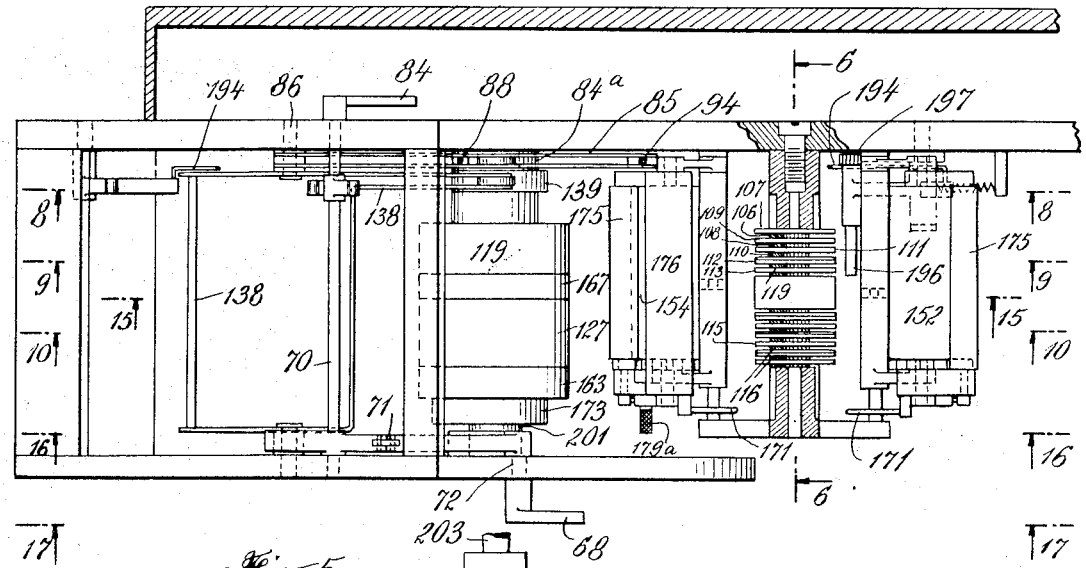
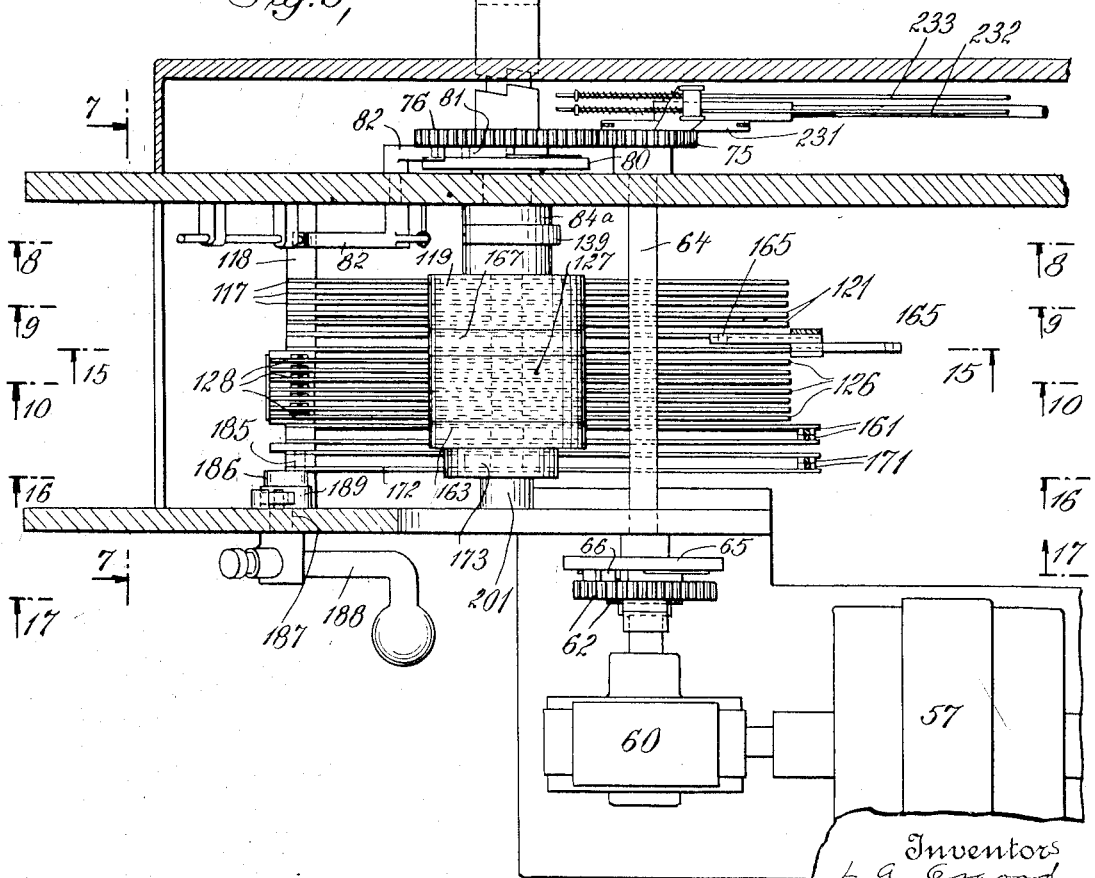

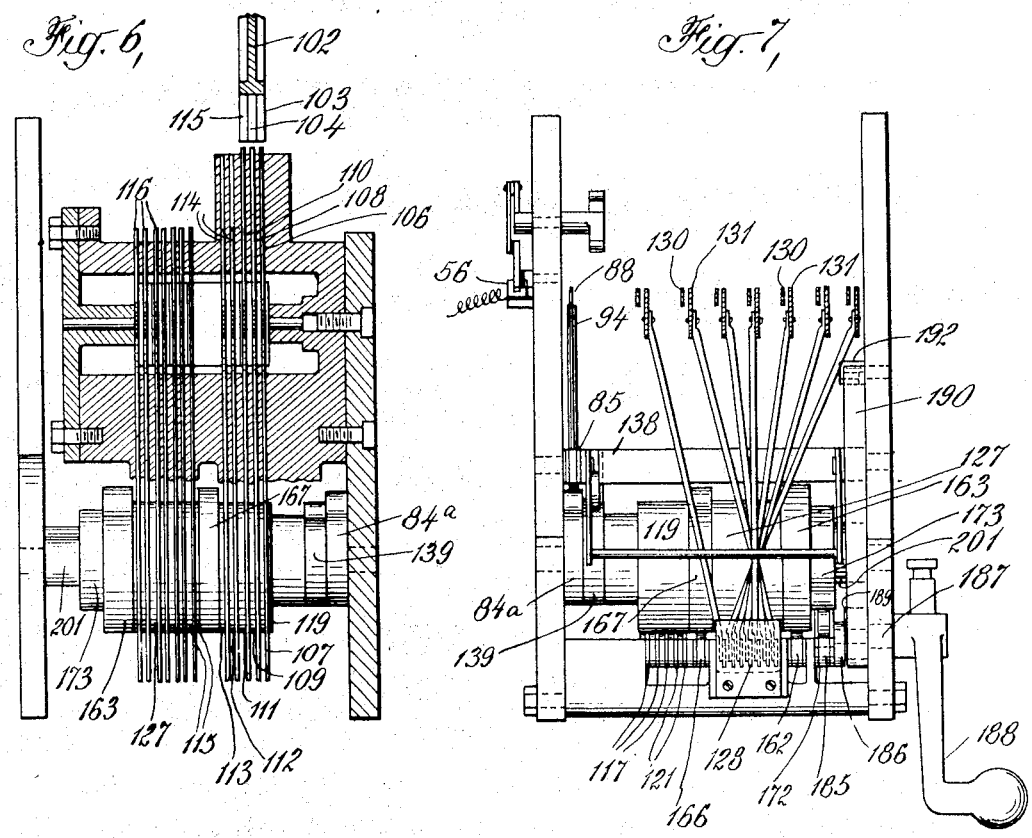
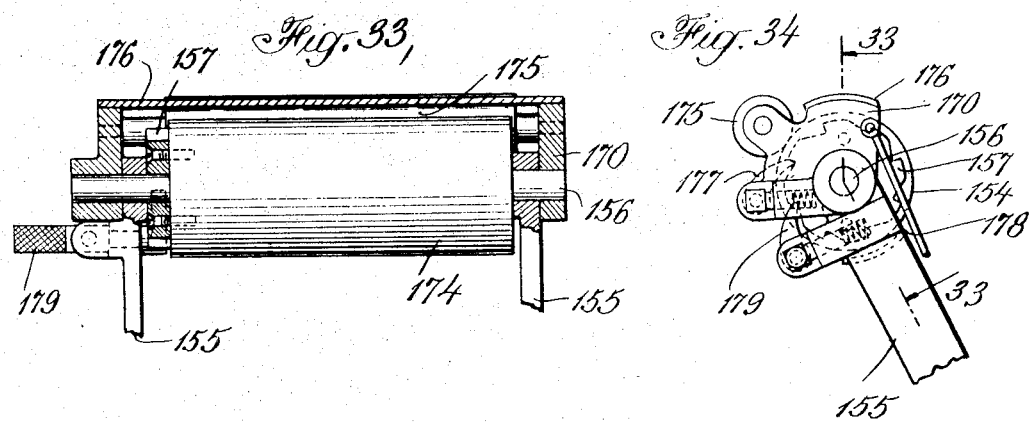

March 4, 1930.  L. A. OSGOOD ET AL  1,749,192
AUTOMATIC RECORDING SCALE
Filed Dec. 8, 1920  15 Sheets-Sheet 5
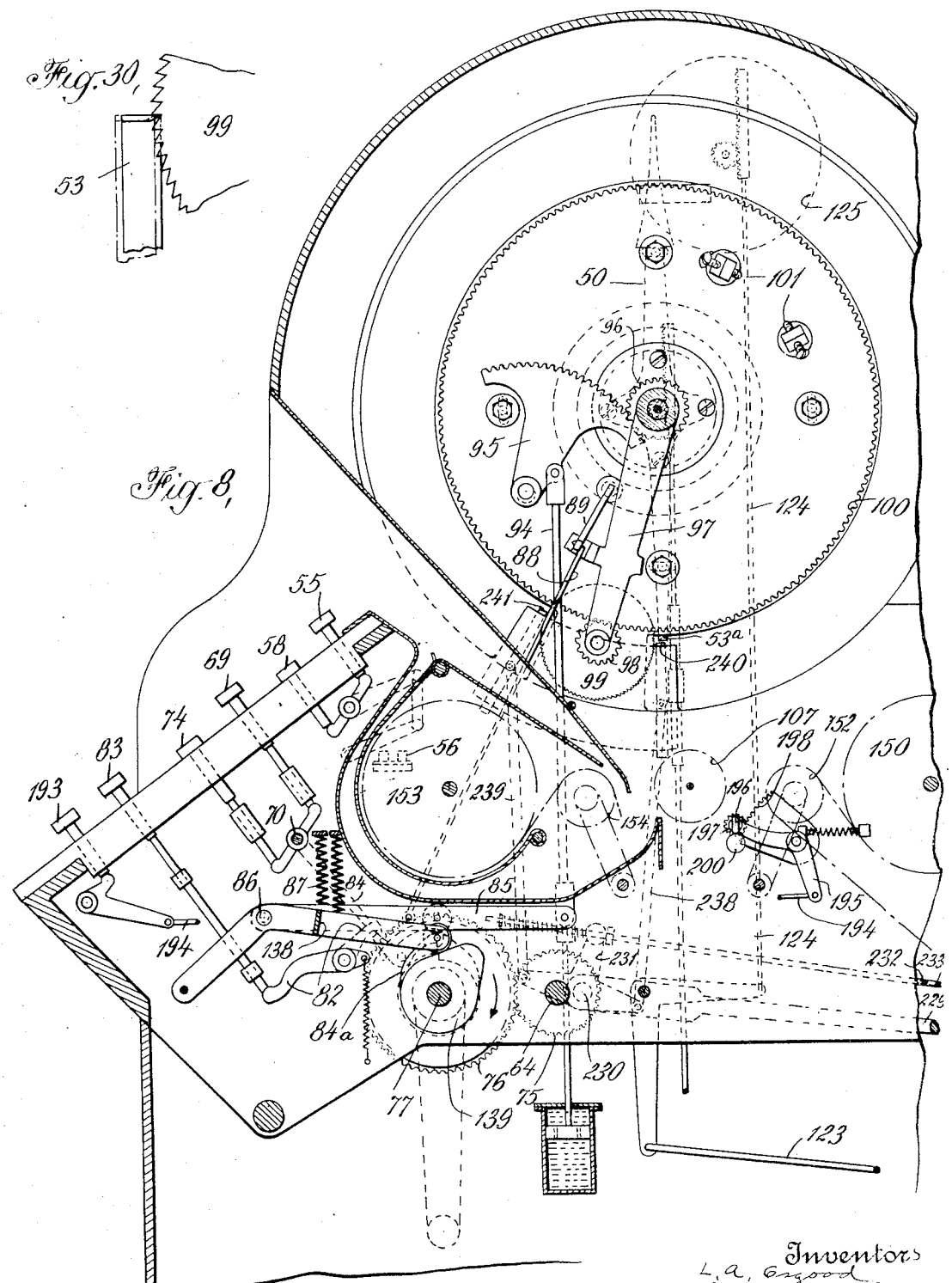

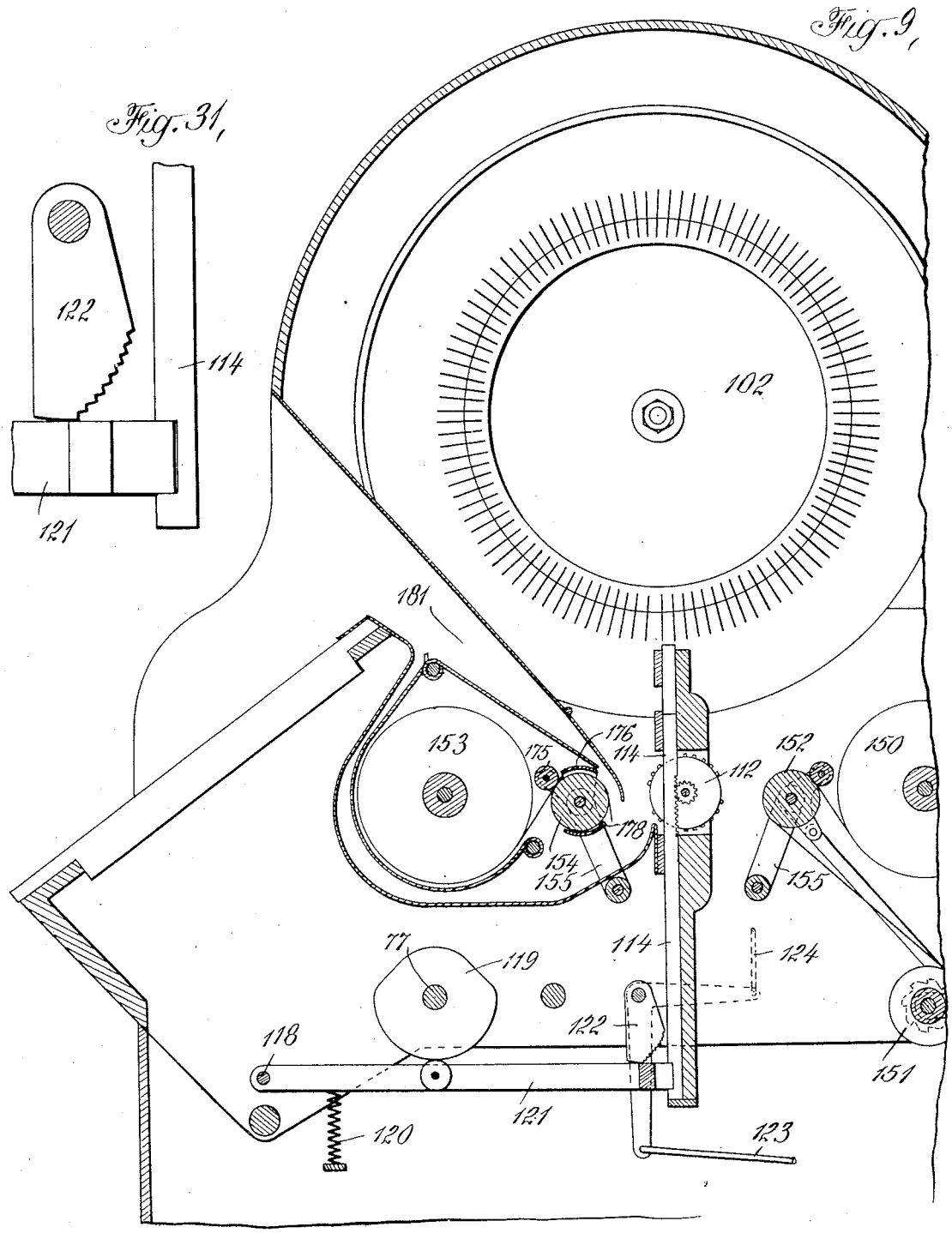

March 4, 1930.  L. A. OSGOOD ET AL  1,749,192
AUTOMATIC RECORDING SCALE
Filed Dec. 8, 1920  15 Sheets-Sheet 7
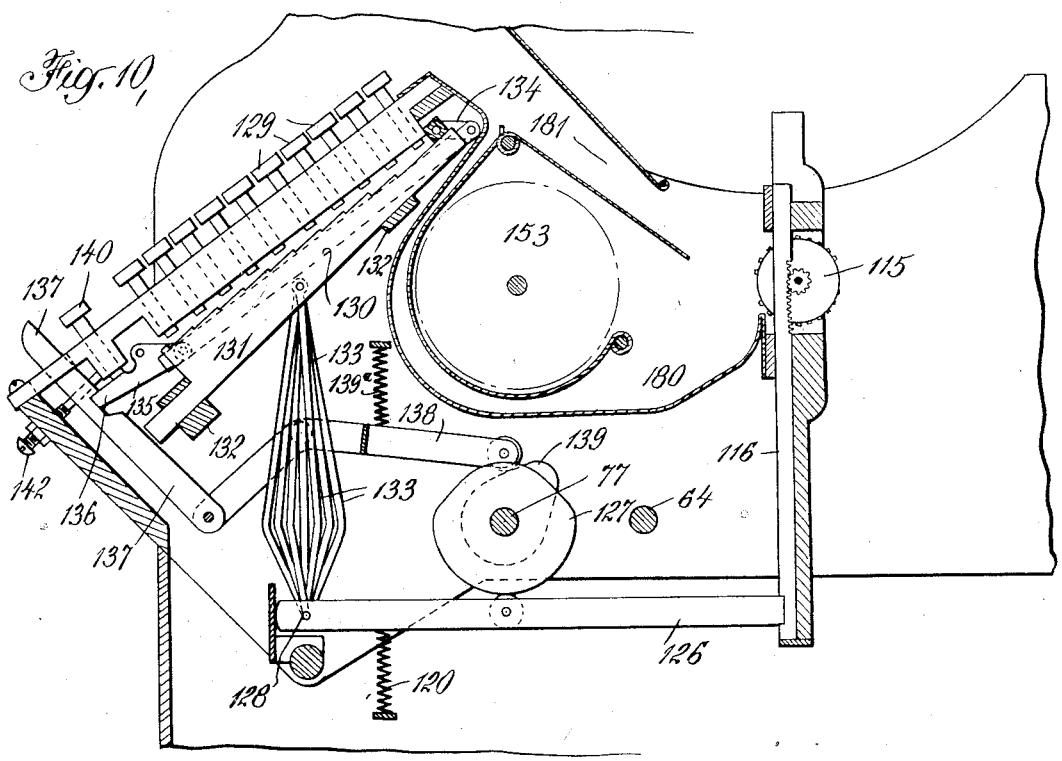
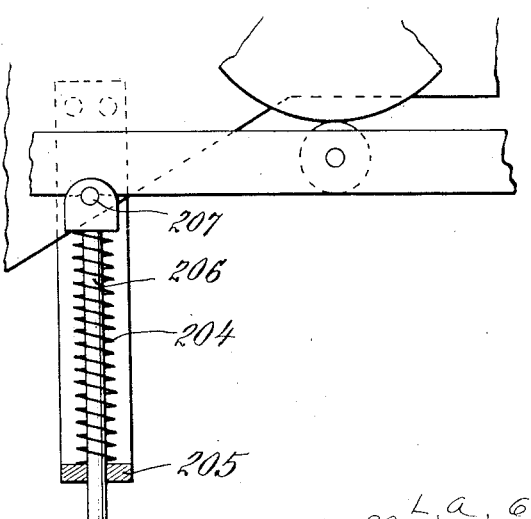

March 4, 1930. L. A. OSGOOD ET AL 1,749,192
AUTOMATIC RECORDING SCALE
Filed Dec. 8, 1920 15 Sheets-Sheet 8
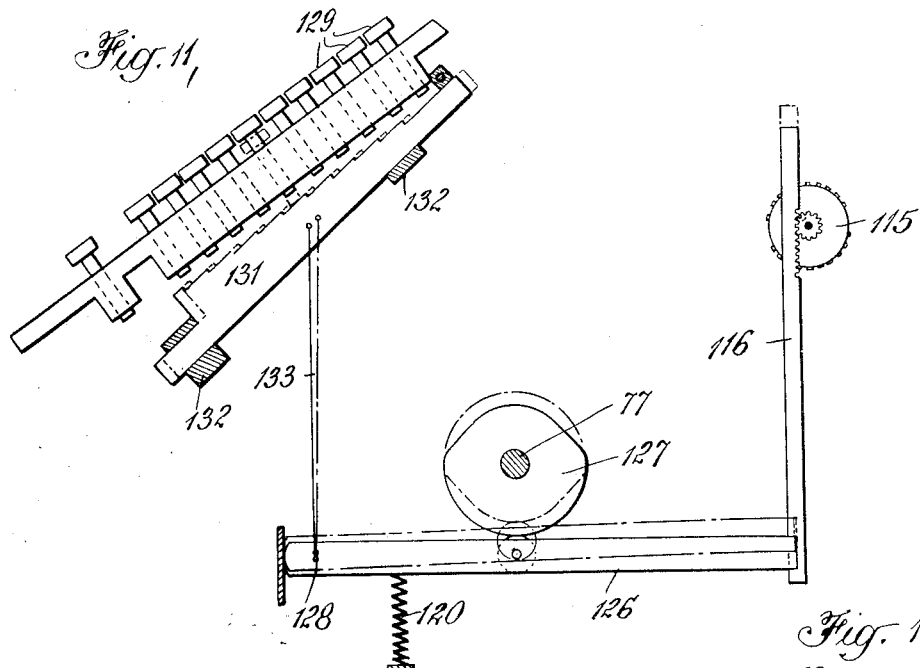
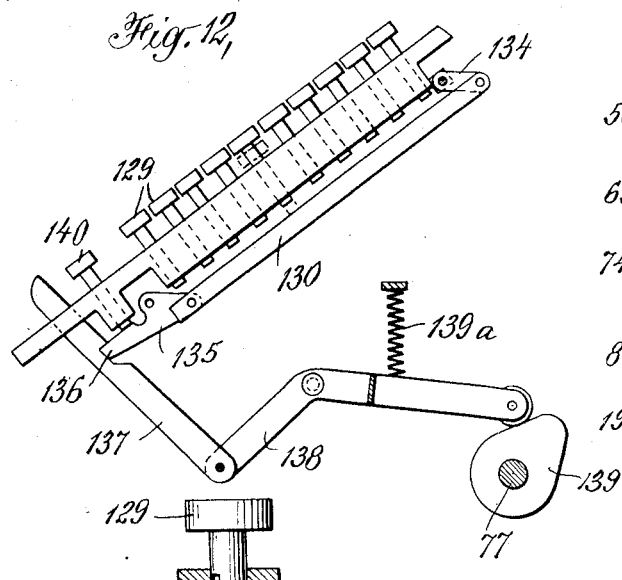
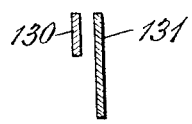
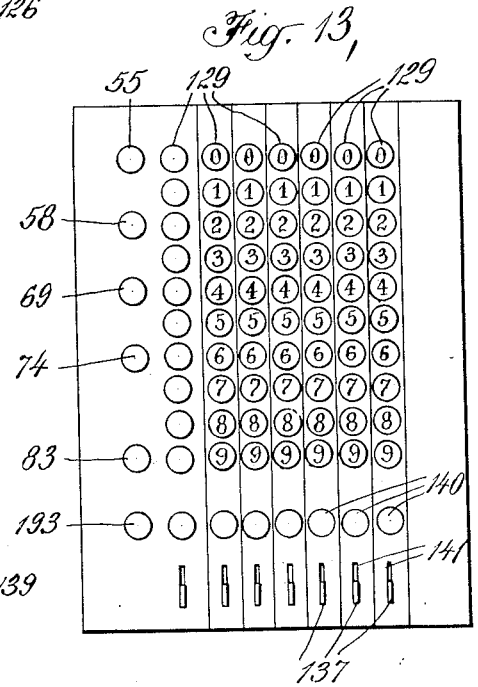

March 4, 1930.  L. A. OSGOOD ET AL  1,749,192
AUTOMATIC RECORDING SCALE
Filed Dec. 8, 1920  15 Sheets-Sheet 9

Inventors
L. A. Osgood
+ Elmer E. Wolf
By their Attorneys.
Kerr Page Cooper & Hayward March 4, 1930.  L. A. OSGOOD ET AL  1,749,192
AUTOMATIC RECORDING SCALE
Filed Dec. 8, 1920  15 Sheets-Sheet 10
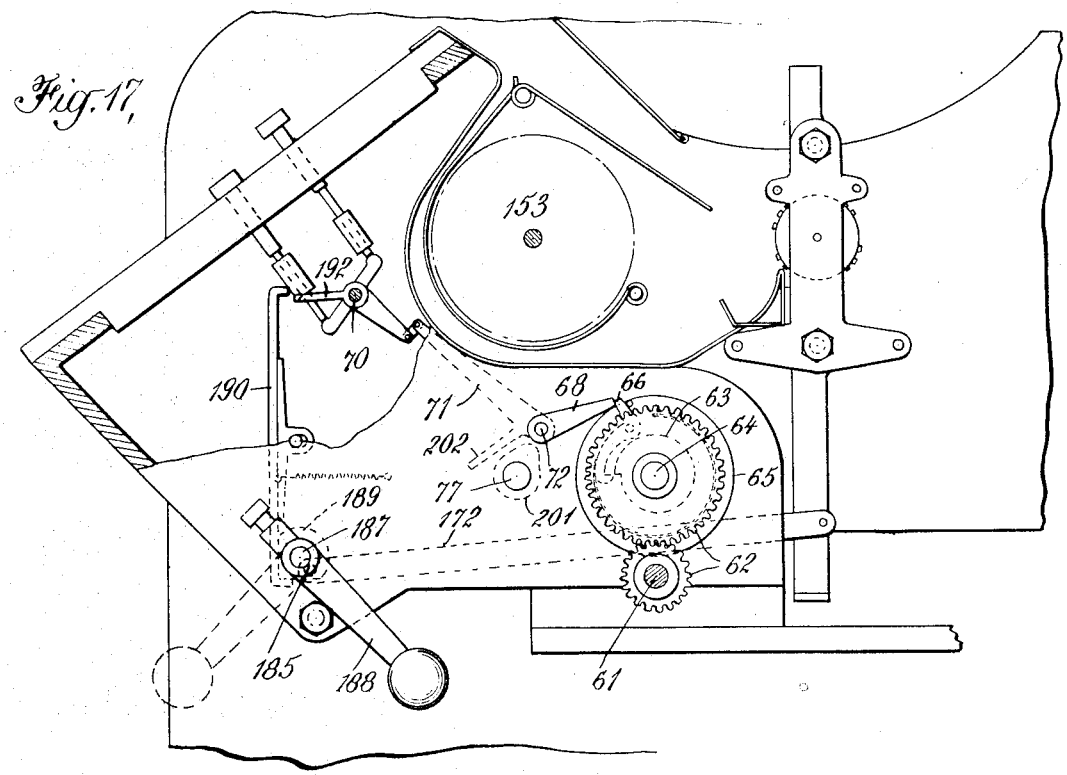
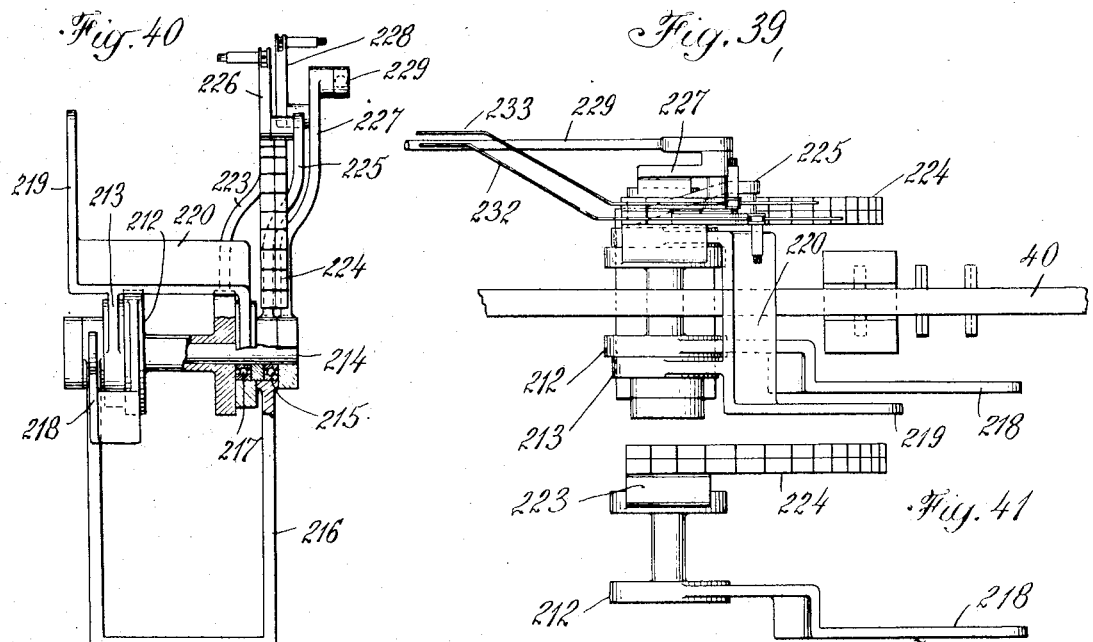

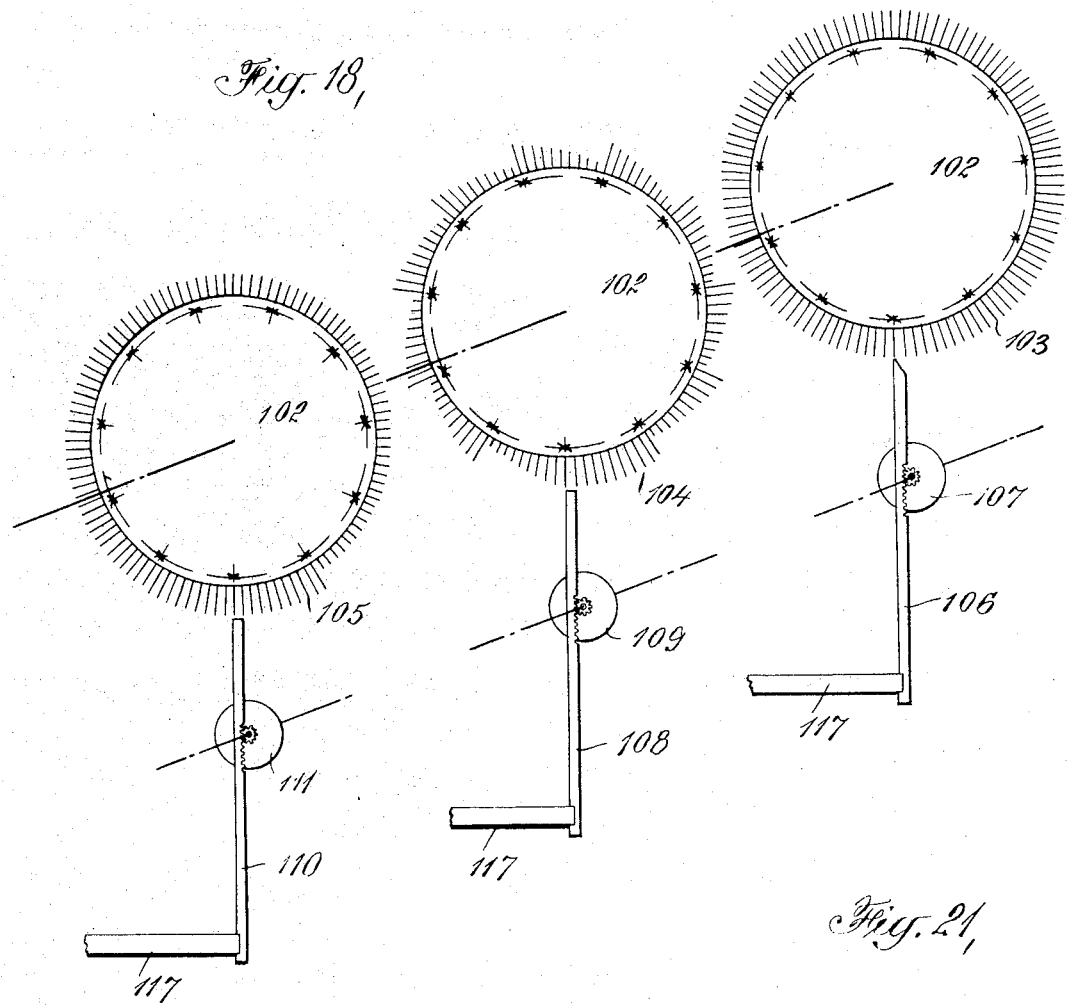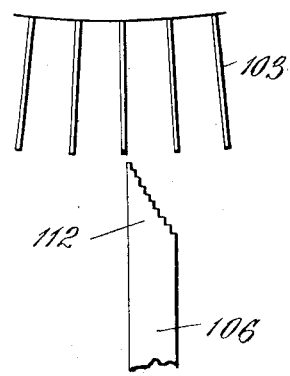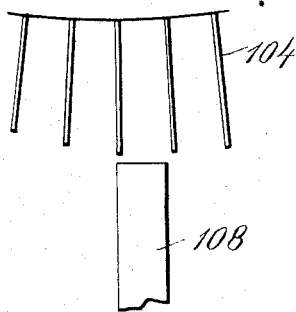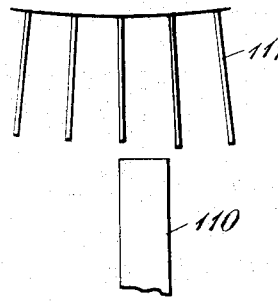

March 4, 1930. L. A. OSGOOD ET AL 1,749,192
AUTOMATIC RECORDING SCALE
Filed Dec. 8, 1920 15 Sheets-Sheet 12
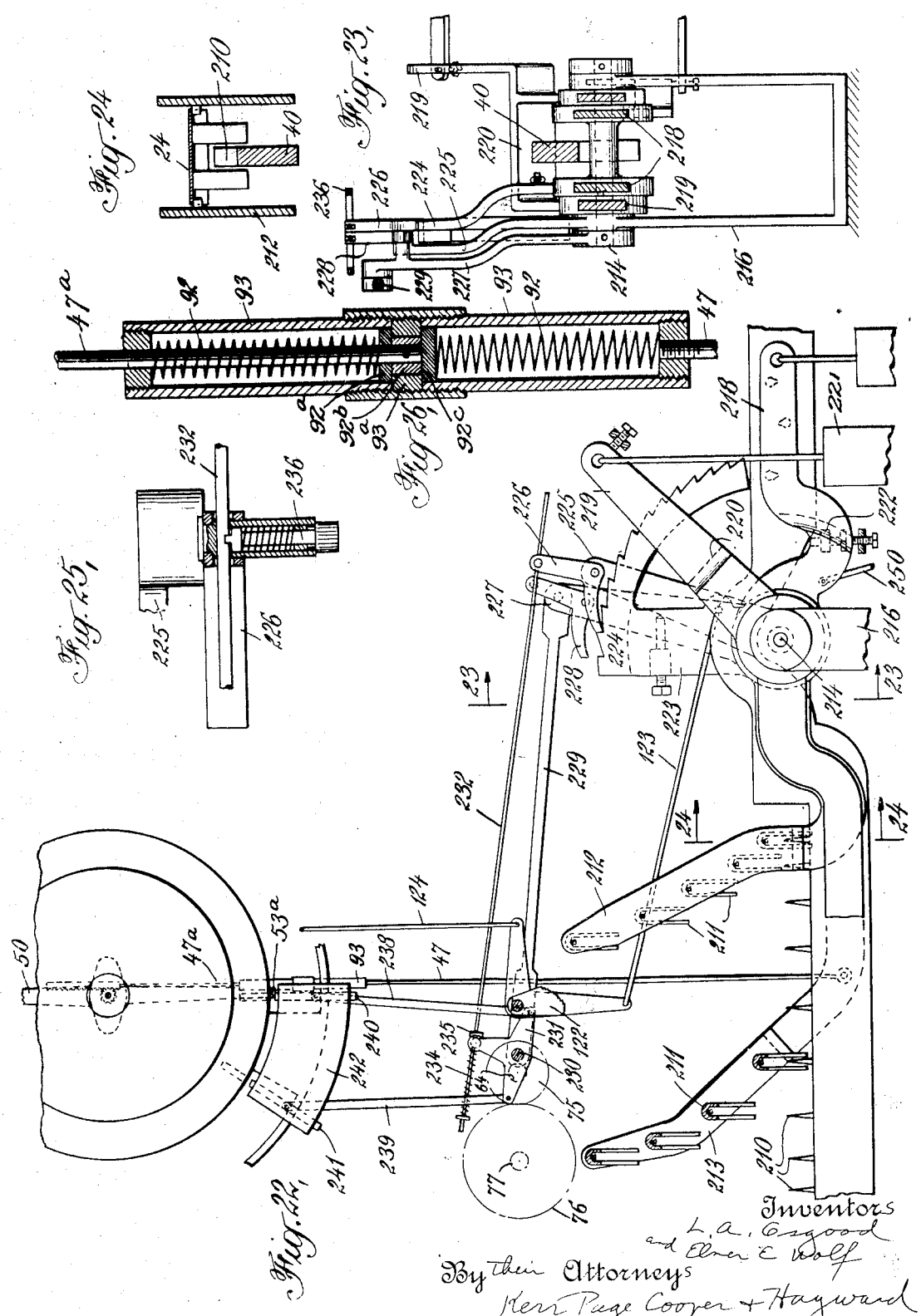

March 4, 1930.  L. A. OSGOOD ET AL  1,749,192
AUTOMATIC RECORDING SCALE
Filed Dec. 8, 1920  15 Sheets-Sheet 13

Inventors
L. A. Osgood
Oliver C. Wolf
By their Attorneys
Kerr, Page, Cooper & Hayward

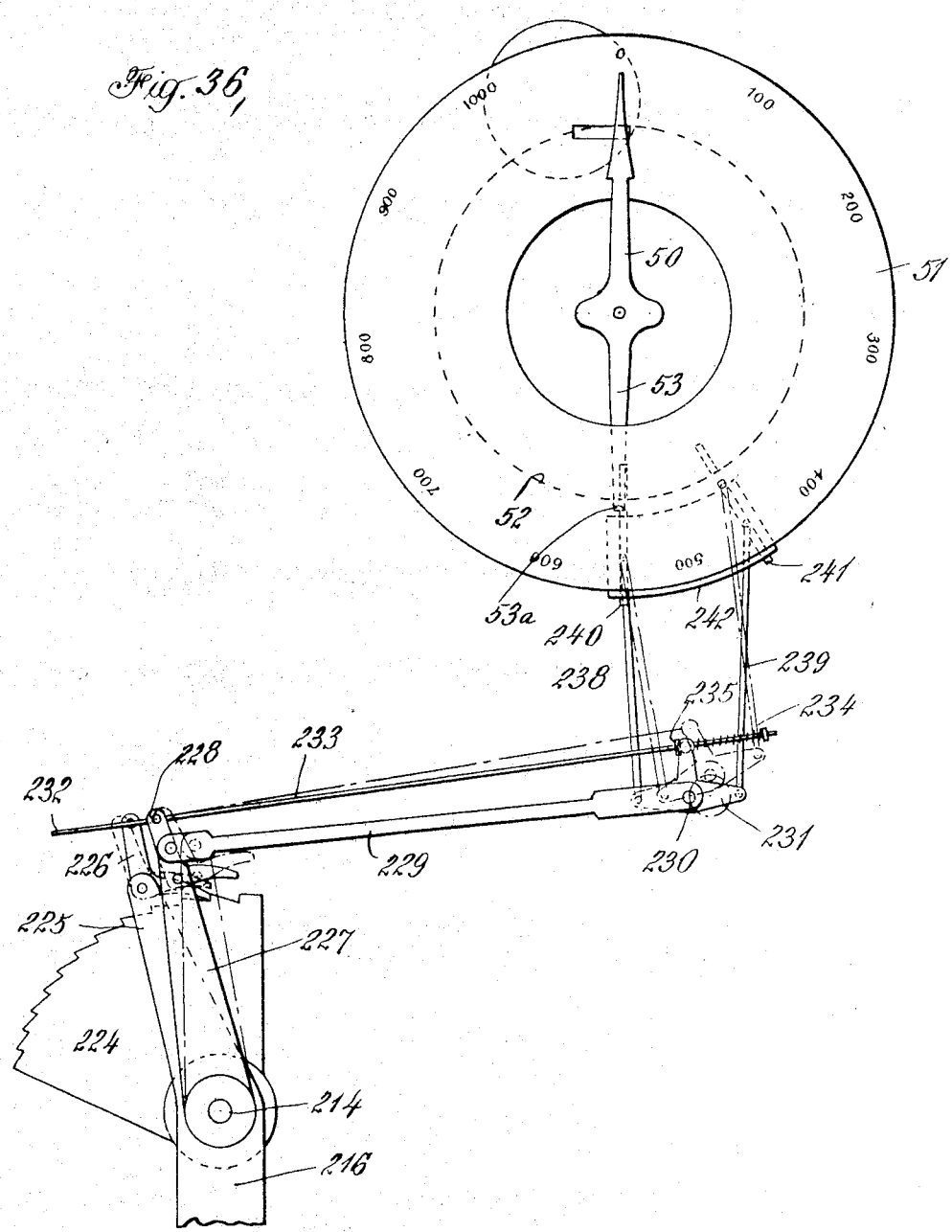

March 4, 1930.  L. A. OSGOOD ET AL  1,749,192
AUTOMATIC RECORDING SCALE
Filed Dec. 8, 1920  15 Sheets-Sheet 15

Inventors
L A Osgood
Elmer E Wolf
By their Attorneys
Kerr Page Cooper & Hayward

Patented Mar. 4, 1930

1,749,192

UNITED STATES PATENT OFFICE

LOUIS A. OSGOOD, OF DAYTON, AND ELMER E. WOLF, OF SPRINGFIELD, OHIO, ASSIGNORS, BY MESNE ASSIGNMENTS, TO DAYTON SCALE COMPANY, OF DAYTON, OHIO, A CORPORATION OF NEW JERSEY

AUTOMATIC RECORDING SCALE

Application filed December 8, 1920. Serial No. 429,053.

In the patents to L. A. Osgood, Nos. 1,198,650 and 1,198,651, there are shown and described a weighing apparatus which comprises a scale beam, and main counterbalancing means therefor, and a weight carrier supported adjacent the beam and adapted to deposit one or more weights upon the beam when the capacity of the main counterbalancing means is exceeded. These weights have generally become known as "capacity weights" due to their particular application and use in weighing machines of this class. In the patents to L. A. Osgood No. 1,198,652, and to Elmer E. Wolf No. 1,295,406, there are shown and described recorder devices which are particularly adapted for use with the weighing apparatus heretofore mentioned.

The present invention relates particularly to improvements in the scales and recorders mentioned above to the end that these devices may perform certain additional functions and to the end that certain old functions may be performed in a more efficient manner.

It is one of the objects of the present invention to provide means for automatically applying one or more capacity weights to the scale beam when such application is needed to give the proper indication and record of the load weighed and to provide a structure for this purpose which will not be subject to the objectionable features of former apparatus of this character.

It is a further object of the present invention to provide means for automatically removing one or all of the capacity weights when a portion or all of the load is removed from the scale platform.

A further object of the present invention resides in the provision of a recorder for a scale of this character, which recorder will give not only weight records but records of dates, bill of lading numbers and other data.

A further object resides in the novel means for controlling the operation of the recorder in accordance with the weight on the scale and in accordance with certain key settings set up manually by the operator. The control of the recorder for weight records is such that the scale operation or its sensibility or accuracy is not interfered with.

A further object of the present invention resides in the provision of a source of motion independent of the weak motive power of the scale for operating the recorder and controlling, applying or removing the capacity weights to and from the scale beam.

A further object resides in the provision of a novel controlling means for the recorder and the capacity weight applying means whereby such operations are under the control of certain keys placed in an accessible position to the operator.

Other objects reside in the provision of certain improvements in the recorder whereby bills of lading, inserted tickets and other record members may be used. Other novel recorder features will be more fully described in the accompanying specification.

Broadly stated, the apparatus comprises a scale with a capacity weight applying means which is adapted to be operated automatically by a motor to apply the proper number of weights. This operation is effected by the depression of a weighing key. A plurality of setting devices are provided in the form of keys arranged on a keyboard and the depression of these keys is adapted to control the printing of correlated data such as dates, bill of lading numbers, etc. A printing key is also provided which when depressed takes off a record of the weight and correlated data.

Certain other objects and advantages will be set forth more fully in the specification and shown in the drawings, which illustrate one embodiment of the invention.

In drawings:

Fig. 1 shows a rear elevation of the apparatus with the cover of the housing removed to show the interior construction.

Fig. 2 shows a horizontal section taken on line 2—2 of Fig. 1.

Fig. 3 shows a vertical section of the dial portion of scale and the recorder.

Fig. 4 shows a top view of the keyboard section of the recorder with keyboard removed. This view also shows a top view of the detail slip and check printer and the common type wheels from which a printed record is taken.

Fig. 5 is a view of the operating connections from the motor and the cam shaft. This view also shows the parts which are operated by the cams for setting and operating elements of the recorder.

Fig. 6 is a vertical sectional view of the parts shown in Fig. 5, the section being taken on line 6—6 of Fig. 4.

Fig. 7 is a vertical end view of the parts shown in Fig. 5, the view being taken on line 7—7 of Fig. 5.

Fig. 8 is an enlarged view of the scale dial, the follow up devices and the recorder controlling key-board. The section is taken about on line 8—8 of Fig. 5.

Fig. 9 is a view similar to Fig. 8 but with the section taken on a different plane, namely on line 9—9 of Figs. 4 and 5. This view shows the printer devices and the means for controlling the capacity weight type wheel from its controlling segment.

Fig. 10 shows the arrangement of the data keys and their connections to the levers which control the positioning of the data typewheels. This section is taken on line 10—10 of Fig. 5.

Fig. 11 is a diagrammatic view showing the method of controlling the displacement of the type wheels in accordance with the depressed keys on the keyboard.

Fig. 12 shows the means for restoring the keys to normal outer position after the recording operation is completed.

Fig. 13 shows a top plan view of the keyboard.

Fig. 14 shows a detail view of a single key and illustrates the means for retaining the key in depressed or outer position.

Fig. 17 shows a side view of the recorder and shows a part of the controlling linkage for taking records and restoring the parts after recording is completed.

Fig. 18 shows a diagrammatic view of the stepped controller and the cooperating rack finger bars.

Figs. 19, 20 and 21 show enlarged detail views of the hundreds, tens, and units stepped controlling elements, and their cooperating finger racks.

Fig. 22 shows a rear view of the machine and the weight carrier and capacity weight applying and relieving means and the controlling devices therefor.

Fig. 23 is a vertical sectional view of certain of the parts shown in the preceding figure. The section is taken on line 23—23 of Fig. 22.

Fig. 24 shows a detail view of one of the capacity weights and the knife edge support for the same upon the scale beam.

Fig. 25 shows a detail view of one of the ratchet devices forming a part of the capacity weight applier.

Fig. 26 shows a detail view of the two part rack rod which permits the displacement of the scale beam after the parts are locked for taking a record of the weight.

Fig. 27 shows a detail view of the clutch which couples the motor shaft to a machine driving shaft.

Fig. 28 shows a detail view of the manual crank for operating the machine when electric power is not available.

Fig. 29 shows a detail view of the clutch for connecting a driving gear to the recorder cam shaft.

Fig. 30 is a detail view showing the action of the follow up ratchet and the weight positioned part, when said part is displaced through a distance corresponding to less than a unit of weight.

Fig. 31 is a detail enlarged view of the capacity weight segment and its cooperating parts.

Fig. 32 shows a detail view of one of the compression springs for maintaining the cam levers in contact with the cam.

Figs. 33 and 34 are detail views of the platen roll and paper feed roll shown in assembled relation in Figs. 15 and 16.

Figs. 35, 36 and 37 are views which show the cycle of operation of the capacity weight applying means.

Fig. 38 is a detail view illustrating a centering device for the capacity weight link or pitman.

Fig. 39 shows an enlarged detail top plan view of certain of the parts shown in Fig. 2.

Fig. 40 is a view which shows the same parts as shown in Fig. 23 but looking from the opposite side of the machine.

Fig. 41 shows a detail view of one of the parts shown in Fig. 39.

Figure 15:
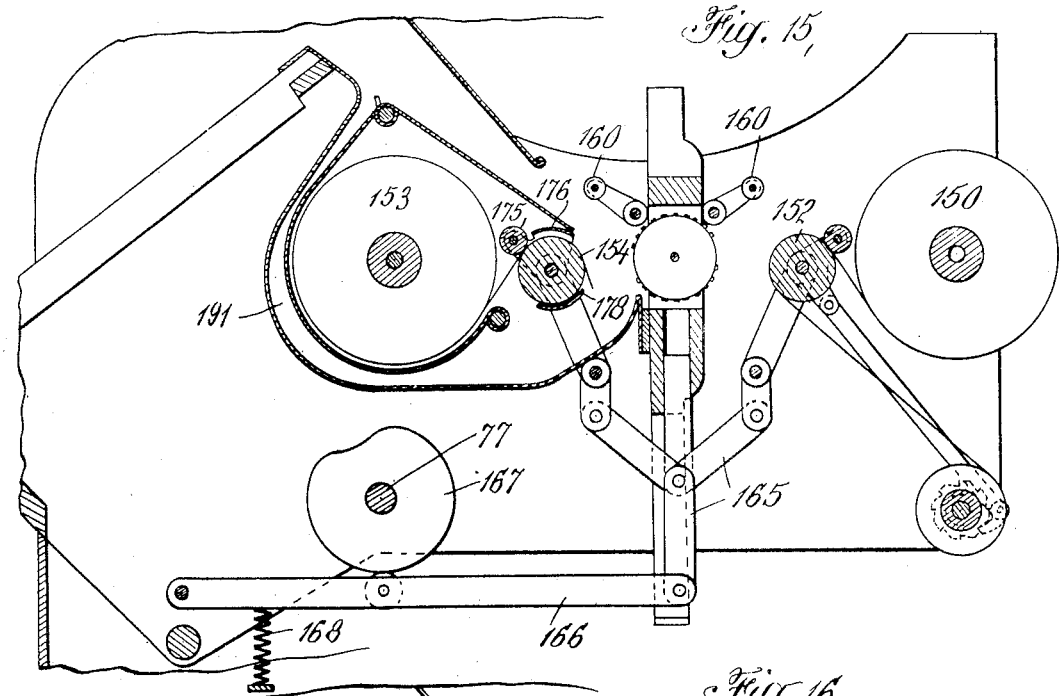
Fig. 15 is a detail sectional elevation of the recorder devices and illustrates the operating mechanism for imparting the record upon the record receiving means. This section is taken on line 15—15 of Fig. 5.

One embodiment of our invention is shown in Fig. 1. The scale therein shown is of the type described in the Osgood Patents Nos. 1,198,650, 1,198,651 and 1,198,757, and in the copending application of L. A. Osgood, Serial No. 371,684. In scales of this general class a main scale beam is provided and in order to increase the capacity of the scale one or more capacity weights are deposited thereon. While certain of the improvements of the present application pertain particularly to the above described capacity weight type scales other features are applicable to scales without such features, such as weighing machines embodying a simple automatic counterbalance without capacity weights.

In Fig. 1 of the drawings 40 designates the scale beam fulcrumed at 41 and provided with a dash pot 42. A steelyard 43 is attached to the beam in the usual manner and extended downward and connects with the base lever system of the scale, or directly with the goods support. Intermediate levers may be employed if desired. Such an arrangement is shown in the application Serial No. 371,684, heretofore referred to. Suitably connected with the beam is a counterbalancing means here shown as comprising a double pair of pendulums 44 connected to an equalizer bar 45 which in turn through a member 46 is connected to scale beam 40. Also connected to the beam is a two part rack rod 47 and 47ª, the latter carrying a rack which meshes with a pinion 48 upon pinion shaft 49. Shaft 49 carries an indicator 50 which swings over a dial 51 (Fig. 3) and thereby indicates the amount of load counterbalanced by the automatic counterbalancing means. Fastened to the pinion shaft and extending over the periphery of a fixed disk 52 is a light member 53 which assumes an angular position relative to the disk 52 in accordance with the displacement of the indicator 50. This member by its position is adapted to control the position of the recorder controlling element. In recording scales difficulty has been experienced in obtaining records due to the low inherent power of a scale. In the present embodiment we provide a separate power means for operating the recorder controlling element in accordance with the displacement of the light weight set part. This power means is entirely independent and separate from the scale and does not affect the accuracy of weighing. The construction employed for this purpose embodies features of the Wolf Patent, No. 1,295,406, and features of the Osgood Patent, No. 1,198,650.

For clearness in description we will assume that a weight within the capacity of the automatic counterbalance has been placed upon the scale platform and the indicator hand has moved accordingly and come to rest. The operator now depresses a start motor key 55 (see Figs. 8 and 13). The depression of this key through a suitable linkage closes an electric switch 56 and establishes the power circuit to a motor 57 (Figs. 1, 3 and 5). The motor then rotates under electric power and rotation continues until the switch is opened by the depression of the stop motor key 58 (Figs. 8 and 13). The motor drives a shaft 59 (Fig. 3) which, through worm gearing 60, shaft 61 and gearing 62, turns a clutch element 63 which is normally freely rotatable upon shaft 64 in a second clutch element 65 (Fig. 27). This element carries a pivoted pawl 66 which is urged into coaction with a shoulder upon clutch element 65 by a suitable spring 67. The pawl is normally prevented from engaging the shoulder, and thereby coupling the shaft 64 so as to be rotated by the motor, by a finger 68.

In order to clutch the shaft 64 to the motor the operator depresses a start weighing key 69 (Figs. 8 and 13). Depression of key 69 rocks a shaft 70 (Figs. 8, 4 and 17), and the rocking of this shaft through a linkage 71 (Figs. 4 and 17) rocks a shaft 72 carrying the finger 68. The clutch is now engaged and rotation of shaft 64 commences. Shaft 64 continues to rotate until the finger is reengaged with the pawl by depression of the stop weighing key 74 or by other means to be hereafter described.

Shaft 64 at its opposite end carries a pinion 75 (Fig. 5) which meshes with and drives a gear 76 which is freely rotatable upon a cam shaft 77 (Fig. 8). The rotation of pinion 75 is adapted to automatically apply or remove capacity weights from the scale beam. This feature of the invention will be hereafter described inasmuch as an operation is now to be considered which does not require the application of such capacity weights to counterbalance the load.

Rotation of the gear 76 does not impart rotational movement to shaft 77 until a so-called printing clutch is engaged. This clutch is in many respects similar to the previously described start weighing clutch and is best shown in Fig. 29. Gear 76 carries clutch element 79 having a shoulder thereon adjacent the clutch element in a disk 80 which is fastened to the shaft 77, and this disk has pivoted thereto a pawl 81 which overlies the clutch element 79. The pawl is urged into engagement with the shoulder by a spring and is normally retracted therefrom by a hooked finger 82 which engages the tail of the pawl. By rocking finger 82 the pawl is released and the clutch engaged. The finger reengages the pawl after one revolution of shaft 77 is completed.

The finger 82 is rocked by the depression of a printing key 83 (Fig. 8), which rocks the shaft carrying the finger. However, the printing key cannot be operated until the start weighing key has been operated. This interlock is effected by a member 84 which is fastened to shaft 70 and arranged to interfere with finger 82 until such time as the shaft 70 is rocked by the depression of key 69. The object of this interlock is to remind the operator to apply the capacity weights if this is necessary and to couple the shafts properly to the motor.

Assuming shaft 77 in the position shown in Fig. 8, the cam shaft now turns clockwise and turns the cams carried thereby. Cam 84ª (Fig. 8) is the follow up device cam and when turned allows a lever 85 pivoted at 86 to descend under the influence of a motor spring 87, which is a part of the power means for actuating the machine. The lever 85 has connected thereto a link 88 which connects to a bell crank 89 (Fig. 8). Rocking of the bell crank 89 (Fig. 3) releases a plunger 90 and allows a ring 91 to which the plunger is attached to be advanced by a spring 91ª, whereby the light member 53 is lightly clamped against fixed disk 52. It will be understood that 53 is not clamped until the indicating pointer has come to rest. This clamp construction is shown and fully described in Osgood Patent, No. 1,198,652. After the indicating pointer is clamped should the operator step upon the load platform or other weight be removed or applied, strains might be set up which would damage the indicating mechanism. To avoid such results the two parts of the rack rod, i. e., 47ª and 47 are provided with intermediate coil springs 92 contained within a cylinder 93 (Fig. 26). The upper rack rod 47ª is attached to an annular member 92ᵇ disposed between upper washer 92ª and lower washer 92ᶜ. The cylinder 93 is provided with a shouldered portion 93ª which is between the two washers. Assume 47ª to be held stationary and 47 to move downward, the member 92ᵇ will move upward relatively to the member 93ª, raising the washer 92ª and compressing the upper spring 92. On the other hand if the rod 47ª be held and the rod 47 moved downward relatively to the member 93ª, the washer 92ᶜ will be lowered and the lower spring compressed.

Lever 85 (Fig. 8) also has connected to it a link 94 which connects with a pivoted sector 95 which meshes with a pinion 96 and rotates a follow up mechanism comprising an arm 97 carrying a rotatable pinion 98 and ratchet wheel 99. The parts are similar to like parts in the Wolf patent. It is sufficient to state that the follow up mechanism rotates angularly under the influence of the motor spring or power means, which is independent of the scale, until the rotary ratchet (rotated by pinion 98 engaging gear 100) coacts with the end of the light member 53 which overlies disk 52 and is arrested thereby.

In explanation of the action of the follow up mechanism it may be stated, if the dial 51 be considered as having ten divisions and one blank division, that the pinion 98 will make a complete revolution for each division and the ratchet 99 will have a number of teeth corresponding with the number of units per division of the dial, or in the present embodiment 100. . In this manner the ratchet wheel and the entire follow up mechanism will be arrested at a variable point for each unit indicated by pointer 50.

If the pointer 50 is between divisions, the ratchet will be arrested at the next lower unit position. Expressed differently, it may be stated that the ratchet is provided with teeth of such character that for fractions of pounds it will arrest the follow up mechanism at the same angular position as at the even pound (Fig. 30).

We preferably provide the gear 100 with an adjustment 101 so that the position of the follow up devices may be varied with respect to certain other parts of the mechanism yet to be described.

*Recorder controlling element*

Fastened to rotate in unison with the follow up device is a recorder controlling element comprising a wheel like drum 102 having stop blades forming a series of steps upon the periphery thereof (Figs. 6, 3 and 18). There are three sets of these blades, namely, unit blades 103, tens blades 104, and hundreds blades 105. If desired, the blades may be made integral and have portions of the proper length to form units, tens and hundreds respectively.

Figs. 18 to 21 show the arrangement of the blades. In these figures 106 designates the unit rack bar or finger which is adapted to set up a unit type wheel 107. 108 is the tens finger rack, 109 its type wheel, and 110 the hundreds finger rack with corresponding type wheel 111. Unlike previous stepped controllers we do not provide a separate blade or step for each unit quantity. Unit blades instead are spaced upon the tens blade positions and the unit rack finger is provided with nine unit steps and a zero step, as shown at 112 in Fig. 21. This arrangement greatly reduces the number of blades and steps necessary and attains unit printing of the weight amounts. The type on wheel 107 are so arranged that with the parts in the position shown in Fig. 21 the type wheel turns to zero position when the rack bar is elevated. Wheels 109 and 111 likewise turn to bring a blank to the printing line. This arrangement eliminates zeros preceding the amount, i. e., 7 will be printed instead of 007. In Fig. 18 the amounts which will be set up upon the type wheels have been indicated between the arrows.

It will be understood that when the units finger rack 106 is elevated to such position as to contact the zero step with blade 103 that the tens rack finger 108 will have contacted with a blade 104 of such length as to bring the next higher tens unit displacement to the type wheel 109. In other words, whenever there is a zero setting of wheel 107 there is a corresponding increased setting of the type wheel of the next higher order, i. e., 109. The same also applies to the relation between tens wheel 109 and hundreds wheel 111. When 109 is at zero the blade length of blade 105 changes, so as to permit a further displacement of the next higher order or hundreds wheel 111.

The limit of capacity of type wheels 107, 108 and 111 is 999 pounds. After this amount is exceeded, one or more capacity weights of 1000 values preferably are applied to the scale beam as will hereafter be described. Therefore in order to print 1000 denomination values, we provide type wheels 112 having type from 1 to 9 and zero with proper blank space also and a single wheel 113 for printing the ten thousand amount. These wheels 112 and 113 are operated simultaneously by means of racks 114. Wheel 113 being blank at all points except when 0 is being printed by wheel 112, the character 1 will be brought to the printing lines on wheel 113. It will be understood that wheels 112 and 113 turn in unison and no impression will be given by wheel 113 except when 10000 lbs. are being weighed. Disposed alongside the last mentioned type wheels are a second group of type wheels 115 which are adapted to print date characters, bill of lading numbers, etc. These wheels are set by racks 116.

In order to elevate the rack rods 106, 108 and 110, a series of levers 117 are provided. These levers are pivoted upon a shaft 118 (Fig. 5) and extend under a cam 119 upon cam shaft 77 and are pressed upwardly by compression springs similar to spring 120 in Fig. 9. Upon the rotation of the cam 119 these levers elevate the racks and turn the type wheels until the racks are arrested by the blades on the controller. Further rotation of the cam 119 restores the levers and type wheels to zero.

The racks 114 which set wheels 112 and 113, are elevated by similar pivoted levers 121 which cooperate with the cam 119 and spring 120 (Fig. 9). The extent of upward movement of these racks is controlled by means of a stepped segment 122 (see also Fig. 31) which, by a linkage 123, connects to an element 224 of the weight carrier system so as to be rocked proportionally to the amount of the capacity weights applied to the beam, as will hereafter be described. Also connected to the capacity weight stepped segment is a link 124 which is adapted to actuate the capacity weight indicator 125 (Figs. 3 and 9), in accordance with the amount of the capacity weights applied to the scale beam.

As is well known in the recording calculator art, the term "differential means" or "differential devices" is utilized in connection with elements which have imparted thereto variable movement and whose extent of movement is variably determined by stop members or stepped members. In the present machine, the parts 121—119 constitute such differential means for the capacity weight type wheels 112, and parts 106, 108, 110, 117 and 119 constitute such differential means for the automatically counter-balanced load recording type wheels. These differential means are respectively controlled by the various stepped controller members, i. e. 122 and 103, 104 and 111.

Racks 116 which control the data type wheels are actuated by a series of levers 126 (Figs. 5, 10 and 11). These levers cooperate with a controlling cam 127 and are provided with similar operating springs 120. In order to impart a variable throw to the levers 126 and thereby vary the data set up on the type wheels 115, the individual levers are provided with a floating fulcrum 128 and the position of this floating fulcrum point is varied by means of a key-board. The keyboard is shown in Fig. 13 and is provided with a plurality of banks of keys. Certain of these keys may represent numerical data of various sorts such as dates. Bill of lading numbers, etc., and one bank shown with blank key-heads may be used for any other desired class of data. The exact key-board arrangement and the corresponding type characters on wheels 115 may be varied to suit the particular business in which the machine is to be employed. The individual data keys 129 are individually depressible and are held frictionally in either upper or lower position by the means shown in Fig. 14. Underlying the key stems of the keys of each bank are two plates 130 and 131. The latter plate is a stepped differential segment plate and is slidably mounted in guides 132. Each segment plate 131 is connected by a link 133 to its corresponding lever 126, the point of connection being at the floating fulcrum point 128 of each individual lever (Figs. 10, 7 and 11). Upon actuation of the cam 127 (Fig. 11), the springs 120 elevate the left hand ends of the levers 126 and slide the stepped segment 131 upwardly in guides 132. When the depressed key stem contacts with the shoulder of the segment plate the sliding movement of the plate 131 is arrested and the fulcrum point 128 is established. In this manner the type wheels 115 are set in accordance with the value of the key which is depressed.

At the proper time in the operation of the machine the keys 129 are restored to normal position. This is effected by means of plates 130 which underlie the key stems. Plates 130 are carried upon pivoted links 134 and 135 (Fig. 12). Link 135 has an extended end 136 that engages a notch in a member 137 which is pivoted to a bail 138. This bail is actuated by means of a restoring cam 139 and spring 139a, whereby the plate or plates 130 are swung upon the pivoted hangers 134 and 135 to restore any depressed keys to outer position. Should any key 129 be improperly depressed, the key can be restored prior to the setting of the type wheels by means of restoring keys 140. One of these keys is provided for each bank and each restoring key is adapted to swing the hanger 135 and to thereby restore the depressed key of that particular bank.

In certain operations, for example with date data, it may be desirable to retain a certain setting of certain or all of the data keys and to prevent the restoration after each operation. For this purpose the members 137 are extended through off-set slots 141 in the keyboard and by swinging the desired members 137 downwardly they will clear the ends 136 of the hangers 135 and be ineffective to actuate the restoring bars upon the actuation of the restoring cam. It may be desirable to adjust certain of the key-banks 7 relatively to the stepped segments. This is effected by adjusting the set screws 142 (Fig. 10).

The foregoing description has explained the method of setting the various type wheels. These different type wheels are provided with double sets of type in order to secure a duplicate record of the transactions. The present machine provides means for taking a record upon a detail strip of all the transactions. The record is also impressed upon a check which is cut off from a paper tape and delivered at each operation. This check device may be so adjusted that a plurality of successive records will be printed upon one check and the knife device will be disabled until the desired number of transactions may be recorded. Also, if desired, slips, or cards, of any desired form may be inserted in the machine and a record impressed thereon. The recorder is particularly adapted for various weighing operations inasmuch as for continuous weighing a number of successive records can be printed upon one check which is then cut off and delivered.

Figure 16:
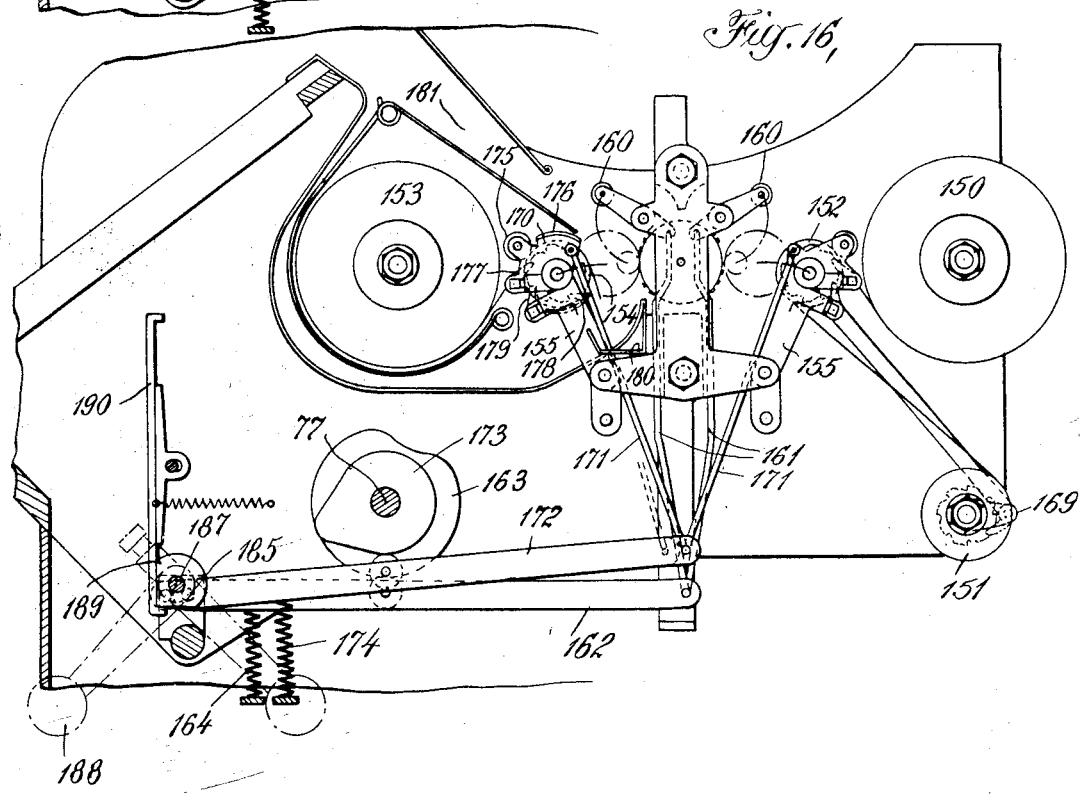
Fig. 16 shows a similar outside elevational view of the parts shown in Fig. 15. This view is taken on line 16—16 of Figs. 4 and 5.

Referring to Figs. 9, 15 and 16: 150 and 153 are detail strip and check supply rolls, 152 and 154 are the detail strip and check platen rolls, and 151 is the detail strip take up roll. Rolls 152 and 154 are normally disposed away from the type wheels by their supporting arms 155 in order to permit the inking of the type wheels. Inking is effected by inking rollers 160 which are brought into contact with the type wheels and then carried away by means of links 161 which connected with a lever 162 which is operated by inking cam 163 and restored by a spring 164 (Fig. 16).

The paper carried by rolls 152 and 154 is brought into contact with the type wheels by means of a toggle linkage 165 which connects to arms 155 and is actuated from lever 166, which, in turn, is operated by printing cam 167 and return spring 168. The feeding of paper from supply rolls 153 and 150 over the platen rolls is effected by similar mechanism which is provided for both rolls. Only that for roll 154 will therefore be described. Paper is wound up on detail strip take up roll 151 by a ratchet device 169 (Fig. 16).

Referring to Figs. 33 and 34: Arms 155 are bored to provide a bearing for platen roll shaft 156. This shaft also forms a pivot support for a frame 170 which carries a transverse knife 176 and a presser feed roller 175 which is journalled therein. The end of the platen roll 154 has a feed ratchet 157 secured thereto. Frame 170 also carries a feed ratchet pawl 177 and arm 155 carries a restraining pawl 179.

Assuming that a check has been printed and the platen roll 154 (and 152) restored to outer position: Frame 170 is now rocked counterclockwise by means of links 171 connected to lever 172 which is operated by a cam 173 and spring 174. Upon this clockwise rocking of the frame 170 the platen roll 154 and presser roll 175 are rocked in unison in the arms 155 until knife 176 coacts with fixed knife 178 (Fig. 15) and cuts off the check. Pawl 177 and ratchet 157 cooperate to cause the concurrent rotation of the platen roll and presser roll. Thereafter upon the return movement of the frame a restraining pawl 179 prevents retrograde rotational movement of the platen roll; the presser roll 175 then rolls idly over the paper strip thereby permitting the end of the paper strip to be presented in position to form the next check.

The severed check drops into a tray 180. If cards or slips are to be printed, they are preferably inserted through a slot 181. When inserted slips or cards are being printed, we preferably disable the restraining pawl 179 by means of a knurled knob 179$^a$ to prevent the feed and consequent waste of the check paper.

When it is desired to record a plurality of successive items upon a check, the knife is disabled. Referring to Figs. 16, 17 and 7, the knife actuating lever 172 is fulcrumed upon a stud 185 carried by a crank block 186. This block has an extended shaft 187 which carries a block 189 and also has fastened to its end a detachable handle 188. Block 189 has two flat sides (Figs. 16 and 17). Engaging this block is a pivoted spring plate 190. With the parts in the full line position, as shown in Fig. 17, the knife is actuated at each operation of cam 173. By swinging the handle 188 to the left dotted line position in Figs. 16 and 17, the fulcrum point of lever 172 will be so changed that the movable knife 176 will not coact with fixed knife 178. The limited movement of the frame 170 carrying knife 176 also diminishes the amount of feed of the check paper strip so as to space the items closely together. The check paper will then be fed forward in a continuous strip and will emerge from the machine through a slot 191. When it is desired to cut off the check, after the desired items are printed, handle 188 is swung clockwise through three quarters of a circle thereby effecting such a change of position of stud 185 as to rock lever 172 about cam 173 as a fulcrum and actuate the knife device to sever the check. During the swinging movement of the handle and at all times when the handle is moved away from "knife on or knife off" position, the pivoted plate 190 engages over interlock finger 192 carried by shaft 70. This interlock prevents the operation of the start weighing key until the handle 188 has been set to proper position away from the intermediate blocking position. It also prevents the operation of the printing key.

In weighing operations it occasionally becomes desirable to cancel a previously printed item upon the detail strip. For example, the incorrect goods may be weighed or an incomplete lot of goods may have been placed upon the scale platform to provide for such cancellations. In this case we provide a cancellation key 193 which through a bell crank and link 194 (Fig. 8) swings a spring retracted pivoted member 195 about its pivot. This member has pivoted thereon a cancellation block 196 having at one end a pinion 197 meshing with fixed gear sector 198. Actuation of the cancellation key swings and rotates the cancellation block from contact with the ink roller 200 into contact with the previously printed impression upon the detail strip.

Upon completion of the printing operation the start weighing key is thrown out by means of a cam 201, which, through plate 202, actuates shaft 72 and throws pawl finger 68 into the path of the tail piece 66 of the clutch pawl (Fig. 17).

In case electric power is not available the machine can be operated by hand by means of a detachable crank 203 which is applied to the end of cam shaft 77 and engages suitable ratchet teeth in a stud extending from gear 76 (Figs. 3 and 28).

For convenience in illustration, springs 87, 168, 164, 174, 120, and 139$^a$ are shown conventionally. Preferably, these springs are heavy compression springs, such as the one shown in Fig. 32. The spring here is indicated by character 204 and is supported at one end by a bracket 205 carried by the frame of the machine. The spring is provided with a central guide stud 206 carrying a forked block at the upper end, which, in turn, supports a stud 207 which rests in a notch in the lever to be actuated thereby. In practice the bracket 205 is in the form of a bail and supports a plurality of similar springs. Upper and lower springs and brackets are provided, as will be readily understood from the conventional showing of the previously mentioned springs.

In automatic scales it has been the practice to apply so-called capacity weights to the scale beam when the counterbalancing capacity of the automatic counterbalancing means is exceeded. In the scales shown in the Osgood patents heretofore referred to, this has been effected by means of a weight carrier which is displaced differentially by hand to deposit one or more weights upon the scale beam. Removal of weights was effected by releasing the weight carrier and allowing it to move to normal position under the influence of a spring or other equivalent means. Such a mode of operation necessitates human intervention in the weighing operation since no weights are applied until the operator himself shifts the weight carrier and if too many weights are added the operator must retract the carrier to the proper extent or at least manually control the extent of retraction.

The present invention provides means for automatically and mechanically applying capacity weights to load the scale beam sufficiently to permit the automatic counterbalancing means to function between its normal limits. The invention further provides means for removing one or more of such capacity weights should load be partially or wholly removed from the scale. The application and removal of weights is effected mechanically and wholly automatically and without requiring thought and subsequent human action on the part of the operator.

It has been previously contemplated to control the application of capacity weights by electric contact devices which are brought into action when the scale beam reaches a predetermined position. These devices have generally proved unsatisfactory due to the irregular action of the contacts.

The present invention provides means for mechanically and positively controlling the application or removal of weights to the beam. This control is effected in accordance with the displacement of a weight set part in such a way that load is not imposed upon the scale in applying or removing the weights and therefore the scale accuracy is not interfered with. Furthermore the physical action of applying or removing the weights is effected in a positive manner by an independent source of power, whereby the chance of incorrect numbers of weights being applied or removed is minimized.

Having explained the general principles under which the capacity weight applied operates, the same will now be explained in detail.

Referring to Figs. 1, 2, 22, 23, 24, 39 and 40: The scale beam 40 is provided with a number of knife edges 210 to receive the individual capacity weights 211. These capacity weights straddle the beam 40 and have provisions to permit their being supported upon the forked arms of a weight carrier. The weight carrier is made in two sections, as shown at 212 and 213, section 213 straddling the other section in the manner shown in Fig. 2. The weight carriers are both supported upon a shaft 214, Fig. 40, which shaft is supported by ball-bearings 215 in fixed frame 216. Ball bearings 217, likewise, are provided between shaft 214 and the hub of weight carrier 213 (Fig. 40). The hubs of weight carriers 212 and 213 are shown at 218 and 219 respectively. 219 in part consists of a cross-member 220. Extensions 218 and 219 are provided with suitable counterweights 221 (Fig. 22) which normally tend to restore the weight carriers to the position shown with all capacity weights removed from the beam. When in this position the weight carriers are limited against further movement by suitable stop devices. If the weight carrier 212 be rocked counterclockwise about its support the weights 211 will be successively deposited upon the beam. After all of the weights have been deposited a set screw 222 (Fig. 22) carried by extension 218 contacts with cross bar 220 carried by extension 219 and thereafter swings the weight carrier 213 to successively deposit its capacity weights upon the beam.

Rocking of weight carrier 212 and extension 218 is controlled and effected in the following manner. The hub of weight carrier 212 has an integral arm 223 to which a sector shaped ratchet 224 is attached (Figs. 2, 39, 40 and 41). Fixed frame 216 is provided with an upwardly extending arm 225 (Fig. 40) carrying a stud which pivotally supports a restraining pawl 226 which engages ratchet 224, and which may be disengaged therefrom under certain conditions (Figs. 40 and 22).

Carried by shaft 214 is a swinging arm 227 carrying a pivot stud for a feed pawl 228 which may be thrown into or out of engagement with the ratchet 224 depending upon whether it is desired to feed the ratchet forward or allow it to remain stationary or to return to normal position.

The swinging arm has imparted to it a back and forth swinging movement by means of a pitman 229 (Figs. 39 and 22) which is pivotally connected to the arm and which, at its opposite end, is connected to an eccentric stud 230 carried by gear 75 (Figs. 22, 23, 3, 5, 39, and 40). The extent of swing is just sufficient to ratchet the ratchet wheel one step forward at each revolution of gear 75 and thereby lower the weight carrier or carriers sufficiently to deposit one capacity weight upon the beam. As previously explained, rotation of gear 75 only occurs after the start weighing key is depressed or when the machine is being operated by the hand crank.

The application or removal of capacity weights will be controlled by the in or out status of the feeding and restraining pawls 228 and 226. Pivoted upon stud 230 is a three way trip arm or walking beam member 231. The upstanding arm of this part receives two pawl rods 232 and 233 (Figs. 2 and 39). These rods are provided with springs 234 which abut against the walking beam and stop members 235 which abut against the opposite side thereof. The opposite end of the rods 232 and 233 connect with restraining pawl 226 and feed pawl 228. Connection is preferably made by means of the plunger arrangement shown in Fig. 25. By withdrawing the plunger 236 and turning the same, the pawl can be disconnected from its actuating rod at such times when it is desired to permanently maintain a certain setting of the weight carriers.

Fig. 35 shows the normal position of the walking beam 231. Normally, this beam is centralized with respect to pitman 229 by the spring means shown at 237 in Fig. 38. Connected to the ends of the walking beam are links 238 and 239 which are connected with blocking plungers 240 and 241 respectively. These blocking plungers are slidably supported in a block 242 and extend radially to the periphery of disk 52. When the parts are stationary stud 230 is in alignment with the pitman 229 and the tips of plungers 239 and 240 clear disk 52 sufficiently to permit the floating stop portion 53$^a$ of part 53 to clear the plunger ends 53$^a$. Upon rotation of the eccentric stud 230 the plungers are projected upwardly into slots in disk 52 (Figs. 3 and 22). With the pointer 50 in any position between 0 and 1000 the plungers will pass freely into these slots and thereby allow the restraining pawls and feed pawls to remain in the position indicated in Fig. 35. During the forward movement of the pitman the feed pawl 228 is out of engagement with the ratchet 224. Restraining pawl 226 is "in". Upon retrograde movement, pawl 228 remains "out" and pawl 226 remains "in". Under these conditions, no capacity weights are applied or removed.

Figure 37:
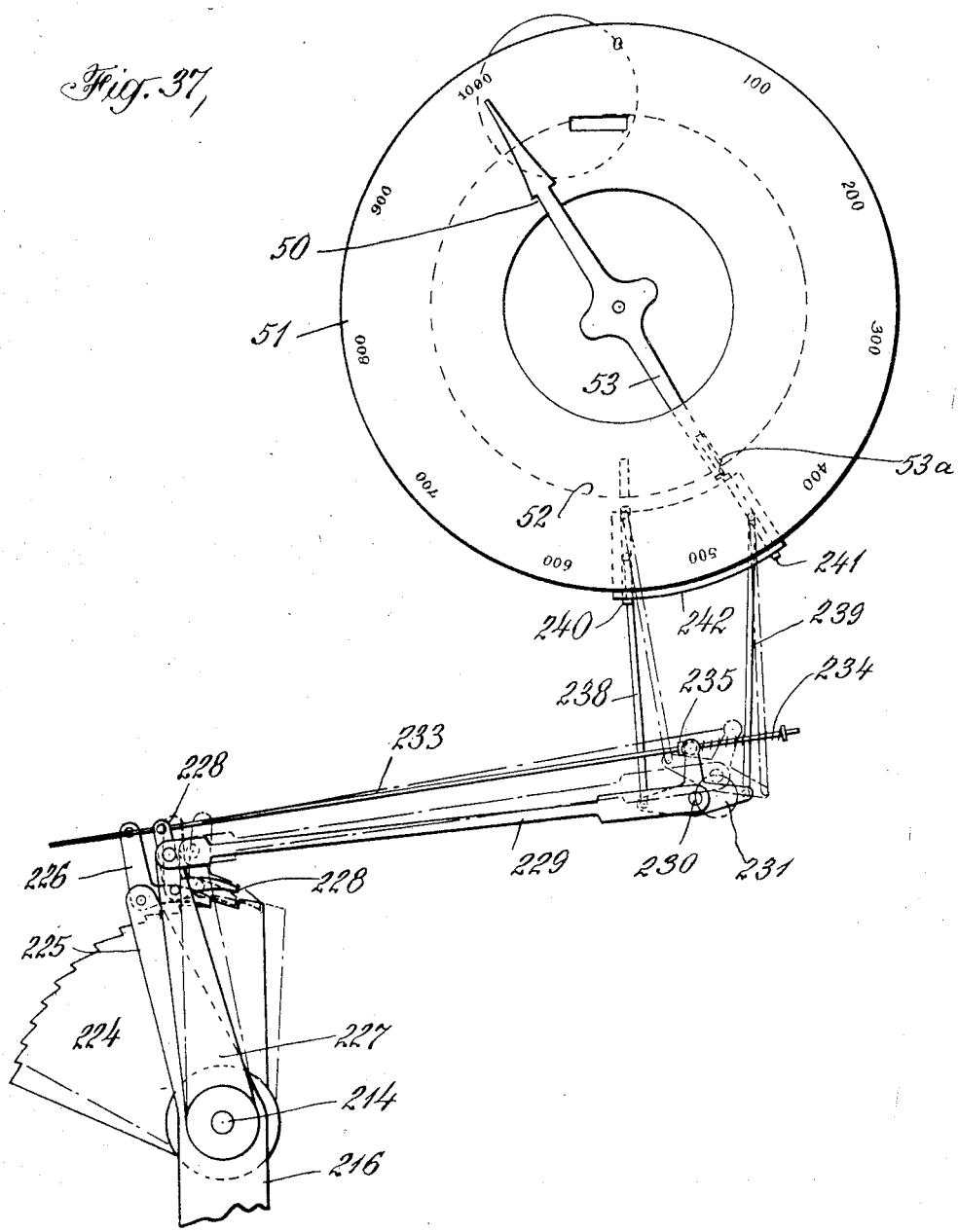

Assume now that a load in excess of the capacity of the dial and the automatic counterbalancing means is upon the scale. This condition is illustrated in Fig. 37. Pointer 50 will stand at the 1000 position and floating stop end 53$^a$ will be in the path of blocking plunger 241, thereby causing a clockwise rotation of the walking beam 231, upon the clockwise rotation of stud 230. This swinging movement occurs substantially immediately after the eccentric stud leaves its normal position and thereby throws the feed pawl 228 into engagement with the ratchet. Thereafter the forward stroke of pitman 229 advances the ratchet one step and deposits one weight upon the beam. During this forward movement of the pitman the restraining pawl remains in, the springs 234 permitting relative movement of walking beam and rod 232. Upon the return movement of the pitman 229 and the arm 227, both pawls 226 and 228 will remain in engagement with the ratchet, and the restraining pawl will prevent the retrograde movement of the ratchet and weight carrier. Should additional weights be required to be applied to the beam, the part 53ᵃ will remain in blocking position and the aforesaid operation will be repeated upon the next succeeding rotation of stud 230. This operation will repeat until part 53ᵃ moves to non-blocking position, i. e., see Fig. 35. Thereafter no further weights will be applied and the weights already applied will be retained by restraining pawl 226.

It will now be assumed that the load either in whole or in part is removed from the scale so that the pointer 50 swings back to the zero position (Fig. 36). Floating stop 53ᵃ will now assume a blocking relation to plunger 240. Upon rotation of stud 230, walking beam 231 is tilted counterclockwise, thereby throwing restraining pawl out on the forward movement of the pitman 229. Feed pawl is likewise out, i, e., this pawl being thrown further out than its normal out position. Upon the rearward travel of the pitman the feed pawl is restored from its excessive out position to normal out position and the restraining pawl is shifted from out to the in position as shown. During a part of this cycle both pawls 226 and 228 will be out and the ratchet 224 will move to normal position and remove the weights from the weight beam. In order to prevent more than one weight being removed per revolution of stud 230 we provide a suitable liquid dash pot which is connected to 218, as shown at 250 in Fig. 22. The liquid dash pot resistance is adapted to so time the restoring action of ratchet 224 that it will only move back one step during the rearward motion of pitman 229. Thereafter the restraining pawl 226 comes into action and prevents further retrograde movement unless the floating stop remains in blocking relation to plunger 240.

The foregoing mechanism provides means for the removal or application of capacity weights from or to the beam by a separate source of power, namely, the counterweight and the motor. The control is effected entirely mechanically by a source of power independent of the weak motive power of the scale which would be unable to effect the shifting of the pawls in itself. Furthermore, delicate electric contact devices are obviated.

What we claim is:—

1. In a recording scale comprising, in combination, a weighing scale, a follow up device, weight changing mechanism for applying weights to a part of the weighing scale, a recorder controller and power means, means for operating the weight changing means from the power means when applied weights are required to counterbalance a load, means for operating the follow up device and said recorder controller from said power means in accordance with the displacement of the weighing scale, means for thereafter positioning type carrying elements of the recorder by said power means to an extent controlled by the recorder controller, means for thereafter taking a printed impression from said type wheels and means for thereafter restoring the recorder, the controller and the follow up device to normal position by said power means.

2. In a recording scale, comprising, in combination, a weighing scale, a follow up device, a recorder controller, power means, means for operating the follow up device from said power means in accordance with the displacement of an element of the weighing scale, means for thereafter positioning type carrying elements of the recorder by said power means to an extent controlled by the recorder controller, means for positioning data type wheels in said recorder, means for taking a printed impression from said weight and data type wheels and for thereafter restoring the type wheels to normal position.

3. In a recording scale, a weighing scale, a weight changing mechanism therefor, a recorder controlled by said scale and weight changing mechanism for recording weights of goods weighed, a power means for operating said weight changing mechanism and recorder, a printing key for coupling said recorder and power means together when it is desired to take a record, the depression of said key being adapted to first set in operation, a follow up device and recorder controller and to thereafter position the recorder in accordance with the controller.

4. In a device of the class described, in combination, a weighing scale, a capacity weight applied therefor, a motor, and a recorder, a star motor key for closing the circuit to the motor, a start weighing key for establishing operating connections between the motor and the capacity weight applier, and for controlling the operation thereof, and a printing key for connecting the motor and the recorder whereby a record of the load weighed is taken.

5. In a device of the class described in combination, a weighing scale, a capacity weight applier therefor, a recorder, a common motor for driving both said applier and recorder, means for coupling the motor with the capacity weight applier, and means for coupling the recorder with the motor to take a record of the load.

6. In a device of the class described, in combination, a weighing scale, a capacity weight applier therefor, a motor, means for coupling the motor with the capacity weight applier, a recorder, means for coupling the recorder with the motor, and means for preventing the coupling of the recorder and motor until the capacity weight applier and motor have been coupled together, whereby recording is not effected until the necessary capacity weights are applied.

7. In a device of the class described, in combination, a weighing scale, a capacity weight applier therefor, a recorder and a motor having provisions for actuating the capacity weight applier and the recorder, key controlled means for opening and closing the circuit to the motor, key controlled means for controlling the connection and disconnection of the motor and the capacity weight applier, and key controlled means for controlling the connection and disconnection of the motor and the recorder.

8. The invention set forth in claim 7, in which means is provided for automatically disconnecting the motor and the recorder after a record has been taken of the applied load.

9. In a device of the class described, in combination, a weighing scale, a recorder controlled by said scale, a motor having provisions for actuating the recorder whereby records of the load weighed on the scale are taken, a printing key for controlling the connection of the motor and recorder, a knife controlling member having provisions for controlling the severing or non-severing of the paper strip in the recorder, and means for preventing the operation of the printing key except when the knife controlling member is in knife on or knife off positions.

10. In a recording scale, in combination, a weighing scale, having a variable displacement in accordance with varying loads thereon, a key-board having a plurality of data keys, a follow up device displaceable in accordance with the displacement of the scale, a recorder controller positioned thereby, means for controlling elements of the recorder from the recorder controller, means for controlling the positioning of other elements of the recorder from the keys on the data keyboard, and means for effecting the positioning of the recorder elements thus controlled and for thereafter taking a printed impression therefrom.

11. In a recording scale, in combination, a weighing scale having elements having a variable displacement in accordance with the load thereon, means for applying capacity weights thereto when the normal capacity of the scale is exceeded, a follow up device displaceable in accordance with a variable displaced element of the scale, a recorder controller positioned thereby, means for controlling elements of the recorder from the recorder controller, means for controlling other elements of the recorder in accordance with the capacity weights applied to the scale, means for effecting the positioning of the recorder elements thus controlled and for thereafter taking a printed impression therefrom.

12. In a recording scale, in combination, a weighing scale having elements thereof variably displaced in accordance with the load thereon, a follow up device displaceable in accordance with the varying displacement of one of the aforesaid elements, a recorder controller positioned thereby, control keys for the recorder, means for controlling elements of the recorder from the recorder controller and means operable upon the depression of a control key for effecting the positioning of the elements thus controlled and for taking a printed record therefrom.

13. In a recording scale, in combination, a weighing scale, a motor, a recording device, a keyboard having a plurality of data keys and a plurality of control keys, a follow up device and a recorder controller positioned thereby, in accordance with the displacement of the scale, means for controlling the positioning of elements of the recorder from the recorder controller, means for controlling the positioning of other elements of the recorder from the keys on the data keyboard and means operable upon the operation of the control keys for effecting the said positioning of the recorder elements and for taking a printed record therefrom.

14. A recording scale comprising, in combination, a weighing scale, a member therein displaceable in accordance with the weight, said member having operative connections to a movable actuating part of the scale comprising a rack and pinion means and a draft rod, said connections including a yielding member disposed in the draft rod and between the rack and the movable part of the scale to permit the moving part to move when said member and the associated rack and pinion parts are locked, a follow up device, a recorder controller and a power means, means for operating said follow up device and said recorder controller from said power means in accordance with the displacement of the member, and means for locking the said member in its displaced position during its coaction with the follow up device.

15. In a recording scale, in combination, a weighing scale, a recorder, a follow up device, a member displaceable by a rack and pinion and in accordance with the actuating movement of a movable part of the scale for controlling the extent of movement of the follow up device, means for locking said member, and a yielding spring connection intermediate the rack and pinion which actuates said member and the actuating movable part of the scale to permit the displacement of said part when said member is locked, said follow up device being adapted to control the operation of the recorder.

16. In a recording scale, in combination, a weighing scale having a weight displaced part, a member connected thereto and normally movable in unison therewith, a follow up device limited in its movement by said member, a recorder controlled by said follow up device, power means for actuating said follow up device and said recorder, and controlling means for the aforesaid power means, means operable by and upon the movement of the follow up device for locking the displaceable member until the follow up device is positioned and for thereafter releasing said member whereby it may again move in unison with the scale part.

17. In a recording scale in which the recording means is controlled by a controller, said controller being positioned by a follow up device, a member displaceable in accordance with the displacement of a movable part of the scale to limit the motion of the follow up device, a power means, means controlled thereby for actuating successively the follow up device, the recorder controller and the recorder, said means which actuates the follow-up device having provisions operable upon initial movement of the follow-up device for temporarily locking the displaceable member until the same has limited the movement of the follow up device.

18. In a recording scale, in which recording is effected by successively acting cooperating follow up devices, a recorder controller and a recorder, a weight set member provided with a rack and pinion for actuating the same for limiting the movement of the follow up device, means for locking said member prior to its coaction with the follow up device, means for maintaining the said lock during the period of coaction with the follow up device and for releasing the same when the recording operation is completed, and means including a yielding spring disposed between the rack and pinion and the actuating moving scale part for permitting independent movement of the scale parts when the weight set member is locked for the purpose described.

19. In a recording scale, in combination, a weighing scale, a data keyboard, a recorder having elements controlled by said weighing scale and elements controlled by said data keyboard, and means in said recorder for conjointly taking a record of correlated weights and data from the said elements.

20. In a recording scale, in combination, a weighing scale, a data keyboard, a capacity weight applying means, a recorder having elements controlled by said weighing scale, said data keyboard and said capacity weight applying means, means for positioning the said elements in accordance with the control thus effected and means for simultaneously taking a record from said elements whereby a record is secured of aggregate weight and of correlated data.

21. A recording scale having in combination a weighing scale having an automatic load counterbalancing means for automatically offsetting applied loads, capacity weight means for supplementing the counterblancing effect of said means, automatic means controlled by the amount of applied load for varying the amount of capacity weight which is utilized in offsetting an applied load, and a recorder having record effecting elements controlled conjointly by the automatic counterbalancing means and by the capacity weight means for recording the weight of the goods upon the scale, said recording effecting elements of the recorder which are controlled by the automatic counter-balancing means being operatively disconnected from said automatic counter-balancing means but displaceable to an extent determined by the displacement thereof, whereby recording operations impart no direct shock upon the automatic counter-balancing mechanism of the scale.

22. In a recording scale having a stepped controller and a follow up mechanism adapted to position the stepped controller in accordance with the displacement of an element of the scale by power means independent of said scale, in combination, a recorder having a plurality of type wheels therein, certain of said wheels being positioned in accordance with the displacement and configurations of the controller, certain others of said wheels being positioned in accordance with the number of capacity weights applied to the scale beam, and certain other of said type wheels being positioned in accordance with manually set devices, and means driven by said power source for taking a record from said type wheels.

23. In a recording scale, in combination, a weighing scale, a recorder controlled thereby to record the weight of goods weighed, a keyboard having a plurality of keys thereon, and means controlled by said keys for concurrently recording classifying data adjacent the records of weight as the same are being made without removing the recording receiving element from the said weight recorder.

24. In a recording scale, in combination, a weighing scale, a recorder controlled thereby to record the weight of goods weighed thereon, a keyboard having a plurality of data keys, means controlled by said keys for recording said data adjacent the weight records, and means for controlling the operation of said keyboard to maintain the setting of predetermined data keys for repeated recording and to restore the remaining data keys to normal position after the taking of each weight record.

25. In a recording scale, a load support, load off-setting means, a part displaced in accordance with the weight offset by the scale, means controlled by said part for recording upon a substantially inaccessible detail strip the said weight, and manipulated means disposed on the machine at a point accessible to the operator for canceling printed records of erroneous weights previously made upon the inaccessible detail strip.

26. The combination with a scale having a part displaced in accordance with the load, of means controlled by the position of said part for recording the weight of goods weighed, and manually controlled means in said recorder and operable by the operator at a point remote from the recorder for canceling erroneous records at will.

27. In a recording scale, in combination with load-offsetting means, means controlled in accordance with the off-set load for recording the weight of the goods upon the scale, means for recording classification data adjacent the printed records of weight, means associated with aforesaid means for canceling erroneous printed records, and means operable at an accessible position on the device for controlling the operation of said last mentioned means.

28. In a recording scale, in combination, a weighing scale, a recorder controlled thereby for recording the weights of articles upon the scale, said recorder comprising means for taking a detail strip record and a check record, a severing device having provisions for automatically cutting off the checks, and means for disabling said severing device at each operation of the recorder when a plurality of successive weight items are to be printed upon a single check.

29. In a recording scale, in combination, a weighing scale, a recorder controlled thereby for recording the weights of articles upon the scale, said recorder comprising a check supply roll, a feeding means, a severing means having provisions for operating automatically at each recorder operation to cut off a check, and means for disabling the said severing means when a plurality of successive weights are to be printed upon a single check.

30. In a recording scale, in combination, a weighing scale, a recorder controlled thereby for recording the weights of articles upon the scale, said recorder comprising a check supply roll, a feeding means and a paper severing means, means for disabling the severing means when a plurality of successive items are to be printed upon a single check, and means associated with said disabling means for varying the action of the paper feeding mechanism, whereby the successive weight records are spaced more closely together when the severing means is disabled.

31. In a recording scale, in combination, a weighing scale, a recorder controlled thereby for recording the weight of articles upon the scale, said recorder comprising a check supply roll, a paper feeding means, and a severing means, means for disabling the effective operation of said severing means when a plurality of successive weight items are to be printed upon a single check, and means operable upon the moving of the last mentioned means to normal position for cutting off the check, having the plurality of weight items, from the check supply roll.

32. In a recording scale, a scale-controlled stepped recorder controlling element adapted to be displaced in accordance with the weight of the goods upon the scale, a plurality of type wheels of varying denomination, a plurality of fingers of varying denominational value adapted to be raised into contact with the stepped controller and to thereby control the positioning of the type wheels and a plurality of steps upon one of the said fingers adapted to cooperate with a common step upon the controller and thereby control the displacement of the corresponding type wheel in accordance with the relative displacement of the said cooperating step.

33. In a recording scale, in combination, a weight set part, a power actuated follow device controlled in extent of movement thereby, a recorder controlling element controlled thereby, said element comprising a plurality of stop devices for units, tens and hundreds respectively, a plurality of type carrying elements, a plurality of fingers adapted to actuate said elements and to control the extent of movement in accordance with the configuration of the stop devices, means for moving said fingers into contact with the stop devices, one of said fingers having a stepped end for cooperation with the stop devices whereby the type carrying element will be displaced in accordance with the step on the finger contacting with the stop device.

34. In a weighing apparatus, in combination, a scale-actuated part adapted to be displaced in proportion to weight, a follow up device adapted to move by an independent source of energy to an extent in accordance with the displacement of said part, a recorder controlling element adapted to be displaced in accordance with the displacement of the follow up device, and type controlling elements adapted to be set in accordance with the displacement of said recorder controlling element and the configuration thereof, a certain one of said type controlling elements being also adapted to be set in accordance with its own configuration whereby units may be recorded.

35. The combination with a scale, a stepped controller governed by said scale, a series of type wheels of varying orders, a series of fingers of varying orders, each finger being adapted to actuate and position a type wheel of corresponding order when brought into contact with the stepped controller, each of said type wheels being provided with type designating numerals and zero, and having suitable blank spaces, means for bringing the fingers into contact with the stepped controller, said finger type wheels and stepped controller being so timed and related each to the other as to bring the blank spaces on the type wheels to the printing line for all denominational orders preceding the first numeral of an amount to be printed.

36. The combination with a scale, a stepped controller governed by said scale, a series of type wheels of varying orders, a series of fingers of varying orders, each finger being adapted to actuate and position a type wheel of corresponding order when brought into contact with the stepped controller, each of said type wheels being provided with type characters designating numerals and zero and also having suitable blank spaces thereon, means for bringing the fingers into contact with the stepped controller, said fingers, type wheels and controller being so timed and related as to set up upon a higher order type wheel a quantity of the next corresponding value when zero is being set up upon the type wheel of the next lower order.

37. A recording scale comprising in combination, a stepped controller positioned in accordance with the displacement of the scale, a units type wheel, a units finger adapted to actuate said wheel when brought into contact with the stepped controller, a plurality of unit steps on said controller, each said step controlling the displacement finger for a series of unit values from one to nine and zero, and a plurality of steps upon the unit finger adapted to control the variable unit and zero settings of the finger and its corresponding type wheel.

38. The combination with a scale, a stepped controller governed by said scale, a series of type wheels of varying orders, a series of fingers of varying orders, each finger actuating and positioning a type wheel of corresponding order when brought into contact with the stepped controller, each of said type wheels being provided with type designating numerals and zero and having suitable blank spaces, means for bringing the fingers into contact with the stepped controller, said fingers, type wheels and controller being so timed and related each to the other as to bring zeros on the type wheels to the printing line for all denominational orders succeeding the last numeral of the amount to be printed.

39. In a weighing scale, in combination, a scale beam and an automatic load counterbalancing means therefor, means operating automatically and mechanically to deposit one or more capacity weights upon said beam when the load applied thereto exceeds the counterbalancing capacity of the automatic counterbalance, and means controlled by but actuated independently of the scale for removing one or more capacity weights from said beam, said last mentioned means including provisions for leaving upon the beam one or more weights from a plurality of weights previously upon the beam, whereby selective removal of one or more of the weights or all of the weights is possible.

40. In a weighing scale, in combination, a scale beam and an automatic load counterbalancing means therefor, means operating automatically and mechanically to deposit one or more capacity weights upon said beam when the load applied thereto exceeds the counterbalancing capacity of the automatic counterbalance, an independent source of power, and means associated with the aforesaid means and actuated by said source of power for removing one or more of a plurality of capacity weights which are already upon the beam when the applied load is less than the capacity of the automatic counterbalance and the counterpoise weight value of the applied capacity weights.

41. In a weighing scale, in combination, a scale beam, an automatic load counterbalancing means and an indicator for indicating the load counterbalanced thereby, means for applying and removing counterpoise weight from the scale, said means being dependent for operation to apply or remove counterpoise weight upon the position of the pivotal indicator, said means being independent of the scale beam.

42. The combination set forth in claim 41 in which the control of the application or removal of counterpoise weight is secured by means comprising a movable scale, positioned element and a coacting moving mechanism driven by a source of power independent of the scale itself.

43. In a weighing scale having an automatic counterbalancing means, a scale beam and an indicator for indicating the load counterbalanced by the aforesaid means, means for applying additional counterpoise weight to the scale when the indicator is in predetermined position and controlling means for said last mentioned means, said controlling means including a movable element of the scale and a coacting mechanism displaceable into cooperation with said scale moved element by a power source independent of the scale.

44. The invention set forth in claim 43 in which means is provided for removing counterpoise weight when the indicator is in certain positions.

45. In a weighing scale, in combination, a scale beam, an automatic counterbalance therefor, indicator for indicating the load counterbalanced thereby, a weight carrier having provisions for applying additional counterpoise weights to the scale, and means controlled by a movable element of the scale and operable when the indicator has reached its limit of movement for (successively) actuating the weight carrier and applying sufficient counterpoise weight to restore the indicator to its intermediate indicating position, the control of the said last mentioned means being effected by the conjoint action of the movable element of the scale and a moving mechanism actuated by power independent of the scale, into coaction with the movable element of the scale to thereby control the operation of the capacity weight carrier.

46. In a weighing scale, in combination, a scale beam and an automatic load counterbalancing means therefor, means including an independent source of power operating automatically and mechanically when the applied load exceeds the counterbalancing capacity of the automatic counterbalance, for depositing sufficient capacity weights on the scale beam to bring the automatic counterbalancing means within its normal range of movement, and a recording means driven by said independent source of power with provisions for recording both the automatically counterbalanced load and the load offset by the aforesaid capacity weights.

47. In a weighing scale, in combination, a scale beam, an automatic load counter-balancing means therefor, means operated by an independent source of power for automatically applying weights to the beam when the applied load exceeds the counter-balancing capacity of the automatic counter-balance, and means for controlling the last mentioned means for bringing about the application of weights, said means comprising a mechanically moved mechanism which includes a part which is itself displaced in co-operation with a scale part, which scale part is movable under the control of the automatic counter-balance, the said first mentioned displaceable part being adapted to miss the scale part when weights are not to be applied.

48. In a weighing scale, in combination, a scale beam, an automatic counterbalance therefor, a pivotal indicator displaced in accordance with the displacement of the automatic counterbalance, a weight carrier having provisions for depositing capacity weights on the scale beam, and means controled by the pivotal indicator for actuating said carrier to deposit proper weights upon the beam when the indicator is in predetermined positions.

49. In a scale, in combination, a scale beam having an automatic load counterbalancing means connected thereto, a weight carrier having provisions for receiving capacity weights and for successively transferring the same to and from the scale beam, a ratchet associated with said carrier to control its movement, restraining and feed pawls associated therewith, a feed pawl carrying arm having a back and forth swinging movement, and means comprising a scale positioned part and a positively driven coacting mechanism for controling the in or out status of the feeding and restraining pawls whereby the weight carrier is actuated to apply capacity weights under certain load conditions and whereby the carrier is permitted to receive and remove weights under other load conditions.

50. In a weighing scale, in combination, a scale beam and an automatic load counterbalancing means therefor and means for successively applying and removing capacity weights on said beam, a motor, means for connecting the said motor and the aforesaid means, upon predetermined conditions of the automatic counterbalancing means, said means having provisions for effecting the connecting of the motor to said means to either effect a placement of the weights or a removal of the same.

51. The invention set forth in claim 50 in which the connection between the motor and the capacity weight applying means is effected by a scale set part and mechanism positively driven by the aforesaid motor.

52. In a weighing scale in combination, a scale beam, and an automatic load counterbalancing means therefor, a pivotal indicator to indicate the automatically counterbalanced load, a dial having graduations over which the indicator sweeps and provided with a blank space, means controlled by a part associated with the pointer and operable when the pointer is in one portion of the blank space for depositing capacity weight upon the scale beam, said means being also controlled by a part associated with the pointer and operable when the pointer is in another portion of the blank space for removing capacity weight from the beam.

53. In a weighing scale including automatic load counterbalancing means and capacity weight applying means, printing devices controlled by said scale for recording the applied load as automatically counterbalanced augmented, if necessary, by applied capacity weights, and means for preventing the operation of said printing devices until after the initiation of the operation of the capacity weight changing means, whereby records are not printed until the scale is properly balanced by both the automatic load counterbalance and the capacity weights.

54. In a device of the class described, in combination, a weighing scale, capacity weight changing means therefor, recording means for printing the load offset by said capacity weight means, a driving means for the recorder and capacity weight changing devices, and means for compelling initial driving of the capacity weight-changing devices prior to the driving of the recorder devices for the purpose set forth.

55. In a recording scale, a load support, load off-setting means including automatic counterbalancing means and capacity weight means, a recording device, means under the conjoint control of said automatic counterbalancing means and said capacity weight means for controlling the setting of said recorder, means in said recorder for canceling erroneous printed records, and manipulated means operable at an accessible point upon the apparatus for controlling the operation of the last mentioned means.

56. In a weighing scale having capacity weight load offsetting means and recording devices to record applied loads including any load offset by applied capacity weights, and means for preventing recording operations until an operation has been initiated to determine the status of the applied capacity weights relative to the applied load.

57. In a weighing scale having capacity weight load offsetting means adapted to be applied to a part of said scale, means for changing the number of applied capacity weights, printing devices for recording the offset load, means for actuating said printing devices, means for operating the capacity weight changing operation devices, means for initiating capacity weight changing and printing operation, and means operable upon the completion of a record for discontinuing the operation of said capacity weight changing means.

58. In a weighing scale including in combination printing devices for recording the applied load, automatic load counterbalancing means, and capacity weight load offsetting means, the aforesaid printing means being adapted to record the total applied load including any load offset by applied capacity weights, means for preventing the initiation of a printing operation until after the initiation of an operation determining the relation of the applied load to the total offset load.

59. In a weighing scale in combination with automatic and capacity weight load offsetting means, printing devices for printing the load offset by either or both of the aforesaid off-setting means, means for initiating printing operations, means for applying and removing capacity weights, means for automatically determining whether capacity weight change is required and means for preventing printing operation until said last mentioned determination has been made.

60. In an automatically counterbalanced scale provided with capacity weight devices for supplementing the automatic load counterbalancing devices to offset the total applied load, printing devices to record the offset load however counterbalanced and automatic devices operable by power independent of the gravity of the load to change the capacity weights when such change is required, said automatic devices operating to effect weight changing operations for removal of weights by step by step operations so that when a number of weights are to be removed such weights are removed one at a time and in succession.

61. In a weighing scale in combination with capacity weight devices for offsetting the applied load, printing devices for recording the offset load, and power driven devices controlled by the scale and driven independently of the gravity of the load and of the capacity weights for positively changing the said capacity weights, said weight changing devices having provisions for supporting the weights during their placement upon a scale part whereby gentle placing of the weights upon said part is effected and whereby erratic operation of the scale attendant from the shock due to free fall of the weights upon the scale part is obviated.

62. The combination with an automatic scale having a member automatically displaced in accordance with the weight of any load within predetermined limits, of means for changing the capacity of said scale when said member is displaced beyond its normal range, means controlled by said member for effecting a record of weight, and means for preventing operation of said capacity-changing and record-effecting means in improper sequence.

63. In a recording scale, a load support, load off-setting means, means displaced in accordance with the weight off-set by the scale, recording means controlled by said last mentioned means to record upon a detail strip the said weight, and key-controlled means for canceling printed records of erroneous weights.

64. The combination with an automatic scale having a member automatically displaced in accordance with the weight of any load within predetermined limits, of an independent source of mechanical power, means for changing the capacity of said scale, a part which is adapted to be moved into cooperation with said member by said mechanical source of power, and means controlled by said member upon its cooperation with said part for causing said source of mechanical power to actuate said capacity changing means to increase the weighing capacity of the scale.

65. A recording scale comprising in combination, a member and means for displacing the same in accordance with the weight of the load upon the scale, automatic counterbalancing means for controlling the displacement of said member, an element operatively connected to said member by a rack and pinion with a cooperating yielding connection which is disposed between the rack and said member, said element being movable with said member so long as said element is free to move, means for locking said element, power means independent of the load upon the scale, a follow-up device, means controlled by said element for causing said power means to cause said follow-up device to assume a position in accordance with the locked position of said element, and recording devices controlled by said follow-up device.

66. A recording scale comprising in combination, a fulcrumed beam, a load support connected to said beam, a source of power independent of the load upon the load support, a manually operable device, means for applying force to said beam in opposition to the load upon said load support, means controlled by said device and by the weight of the load upon said load support for causing said source of power to operate said force-applying means, a second manually operable device, means controlled by the weight of the load upon said load support for effecting a record of weight when said second named device is operated, and means for preventing improper sequential operation of said devices.

67. In a weighing scale in combination, a scale beam, an automatic load counterbalancing means therefor, means including an independent source of power operating automatically when the applied load exceeds the counterbalancing capacity of the automatic counterbalance for depositing sufficient capacity weights on the scale beam to bring the automatic counterbalancing means within its normal range of movement, said means which deposits the weights upon the beam including devices for supporting the weights until they are actually placed upon the beam to thereby obviate free fall of the weights by their own gravity with the attendant shock upon their reception by the beam, and a recording device having provisions for printing the aggregate value of the automatic counterbalanced load and of the load offset by the applied capacity weights.

68. In a weighing scale in combination, a scale beam, an automatic load counterbalancing means therefor, means operated by a rotatable electric driving motor and controlled by a movable part of the scale for automatically applying capacity weights to the beam when the applied load exceeds the counterbalancing capacity of the automatic counterbalance, a recorder device, and means for operating said recorder device to make a record of the applied load whether said applied load is offset by the automatic counterbalancing means or by the capacity weight devices or by said devices acting together.

69. In a weighing scale in combination with a scale beam, automatic load counterbalancing means therefor, a driving motor, capacity weight changing mechanism, means controlled by a movable part of the scale for automatically controlling the operation of said capacity weight changing mechanism and for operating the same by said motor when the applied load exceeds the capacity of the automatic counterbalance, a recorder, and means for operating said recorder by said motor to record the entire offset load including if necessary such load as is offset by the automatic counterbalancing mechanism.

70. In a weighing scale in combination with automatic load counterbalancing means, capacity weight load offsetting means, capacity weight changing means, a recording device having provisions for recording applied loads whether offset by the automatic load counterbalancing means or the capacity weight, means acting independently or conjointly, and a motor with provisions for automatically bringing about the operation of the capacity weight changing means when capacity weights are required to offset applied loads, said motor also having provisions for operating the recorder to make a printed record of an applied load.

71. In a weighing scale having an automatic load counterbalancing means, a supplementary scale beam and a connected load support, in combination, a load offsetting mechanism, a motor for driving the same, means controlled by the position of the scale beam for coupling and uncoupling the motor with the supplementary load offsetting mechanism, said means being ineffective when the beam is in intermediate positions and under the control of the automatic load counterbalancing mechanism.

72. In a weighing scale, in combination, a scale beam, an automatic counterbalance therefor, capacity weights adapted to be applied to said beam for increasing the capacity of the scale beyond the range of the automatic counterbalance, a capacity weight changing mechanism, a controller therefor, a motor, driving connections from the motor to the controller adapted to drive the same to either apply or cause the removal of capacity weights to or from said beam, and beam controlled means for controlling the operations of the driving connection whereby the weights are automatically removed or applied or left unchanged according to the position of the beam.

73. A weighing scale comprising in combination with a scale beam with load offsetting weights and connected load support, means for shifting one or more weights to cause the same to react upon the beam and offset an applied load, and automatically operable means for positively setting said shifting means into operation to apply one or more weights when the applied load overbalances the beam by an amount equivalent to one or more offsetting weights, and automatically operable means for positively setting the shifting means into operation to readjust the number of applied weights, when the weights overbalance the applied load by an amount equivalent to one or more offsetting weights.

74. A weighing scale comprising a scale beam, load offsetting devices therefor comprising weight changing mechanism with provision for depositing and removing weights to and from parts connected with the beam, a driving motor, and means for coupling the motor to said mechanism when the beam is overbalanced by applied load and for uncoupling the same when the beam is restored to a position of equilibrium.

75. A weighing scale comprising a scale beam and load offsetting means therefor comprising weight changing devices with provisions for removing and depositing load offsetting weights from and to a moving part of the scale, a motor for driving said weight changing devices to either remove or apply weights, means for coupling said motor to said weight changing devices when the applied load exceeds the load offset by applied weights, and means for uncoupling said motor and weight changing mechanism when the applied load is exactly counterbalanced by the applied weights, said uncoupling being effected without previous overbalancing of the scale beam by the applied weights.

76. A weighing scale comprising a scale beam and load offsetting means therefor comprising weight changing devices with provisions for removing and depositing load offsetting weights from and to a moving part of the scale, a motor for driving said weight changing devices to either remove or apply weights, means for coupling said motor to said weight changing devices when the applied weights exceed any load offsetting value of the applied load whereby weights are removed, and means for uncoupling said motor and weight changing mechanism when the applied weights exactly counterbalance the then applied load, said uncoupling being effected without previous overbalancing of the scale beam by the applied load.

77. In a weighing scale, in combination, a member which is displaceable under the control of an automatic counter-balance in accordance with applied load, a second member displaceable in accordance with the said first member, means including a capacity weight for increasing the capacity of the scale, means for aligning said second member to a position representing the nearest unit of weight, means for taking a record of weight from said second member, and means for introducing into said recording means the weight value of the capacity weight to thereby record the entire applied load.

78. A weight-recording machine comprising in combination, weight responsive mechanism, means for varying the capacity of said mechanism, printing mechanism for recording an applied load, said printing mechanism including elements for designating the load offset by said weight responsive mechanism and elements for designating any capacity offset effect, said first mentioned elements being displaceable to an extent controlled by the weight responsive mechanism but being operatively disconnected therefrom to prevent recording shocks being applied to the weight responsive mechanism during recording, and means controlled by said first named means and mechanism for causing relative movement of the elements of said printing mechanism to affect the record produced thereby.

79. The combination with an automatic weighing scale, of means for varying the weighing capacity thereof, printing mechanism for recording an applied load, said printing mechanism including elements for designating the load offset by said weight responsive mechanism and elements for designating any capacity offset effect, said first mentioned elements being displaceable to an extent controlled by the weight responsive mechanism but being operatively disconnected therefrom to prevent recording shocks being applied to the weight responsive mechanism during recording, and means controlled by said scale and first named means for causing relative movement of the elements of said printing mechanism to affect the record produced thereby.

80. In a weighing scale having in combination therewith a recording device with provisions for printing a record upon a tape, means operating automatically upon a recording operation for severing the tape to form a check, and means for disabling the automatically operable severing means when a plurality of weights are to be recorded upon a single check.

81. In a device of the class described, in combination, a weighing scale, a capacity weight applier therefor, a motor, a recorder, means for closing the circuit to the motor, means for establishing operating connections between the motor and the capacity weight applier and controlling the operation thereof, and a manipulative means for connecting the motor and the recorder whereby a record of the load weighed is taken.

82. In combination with a weighing scale, the combination comprising, weight responsive mechanism, means for varying the capacity of said weight responsive mechanism, recording devices including elements for printing the total load offset by said weight responsive mechanism under any conditions, and means comprising a differential stop device displaceable to a predetermined and differentially set position upon operation of said capacity varying means to cause influence upon said weight responsive mechanism, said last named differential stop means serving to control in its differentially set position the position of the recording element of said recording devices which is designated for recording variation in capacity effect, upon institution of a recording operation.

83. In combination with a weighing scale, the combination comprising, automatic load counter-balancing means, means for varying the capacity of the scale, recording devices including elements for printing the total load offset by said automatic load counter-balancing means with or without added capacity effect, said recording devices having an element to designate the relation of said capacity varying means to said scale, differential means positionable, upon operation of said capacity varying means to cause influence upon said scale, and means for positioning said element in accordance with the position of said differential means so that a recording operation of said recording devices will result in printing the total load offset by said scale.

84. In combination with a weighing scale, the combination comprising, automatic load counter-balancing means, means for varying the weighing capacity of said weighing scale, differential means under the control of said automatic load counter-balancing means and said capacity varying means, printing mechanism for printing the total applied load irrespective of how the same is offset, said printing mechanism including type means capable of being controlled by said differential means, and other type means capable of being controlled by the portion of said differential means under the control of said capacity varying means, and means to bring said printing mechanism and said differential means into co-operative relation so as to enable the printing of an amount representing the total applied load.

85. In a recording scale, in combination, a weighing scale having elements therein having a variable displacement in accordance with the applied load on the scale, means for applying capacity weights to certain movable elements of the scale, a recorder controller positoned in accordance with the variable displacement of the scale elements under an applied load, a recorder having elements adapted to be controlled by said recorder controller, means for controlling other elements of said recorder in accordance with the capacity weights applied to the scale, means independent of the gravity of the applied load for effecting the positioning of the elements of the recorder thus controlled, and means for thereafter taking a printed impression from said positioned elements.

In testimony whereof we hereto affix our signatures.

LOUIS A. OSGOOD.
ELMER E. WOLF.